United States Patent
Muramoto et al.

(10) Patent No.: US 10,671,248 B2
(45) Date of Patent: Jun. 2, 2020

(54) LIVE AGENT CHAT CONSOLE

(71) Applicant: salesforce.com, inc., San Francisco, CA (US)

(72) Inventors: Kristen Muramoto, San Francisco, CA (US); Patrick Beyries, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 86 days.

(21) Appl. No.: 15/874,281

(22) Filed: Jan. 18, 2018

(65) Prior Publication Data

US 2019/0220154 A1    Jul. 18, 2019

(51) Int. Cl.
| | |
|---|---|
| *H04L 12/58* | (2006.01) |
| *G06F 3/0482* | (2013.01) |
| *G06F 3/0484* | (2013.01) |
| *G06F 9/451* | (2018.01) |

(52) U.S. Cl.
CPC ............ *G06F 3/0482* (2013.01); *H04L 51/04* (2013.01); *H04L 51/32* (2013.01); *G06F 3/04847* (2013.01); *G06F 9/451* (2018.02); *H04L 51/046* (2013.01)

(58) Field of Classification Search
CPC .... G06F 3/0482; G06F 9/451; G06F 3/04847; H04L 51/046; H04L 51/32; H04L 12/1822; H04L 12/1813; H04L 12/581; H04L 29/06027; H04N 7/15; H04M 3/56
USPC .................................................. 715/757, 758
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |

(Continued)

*Primary Examiner* — Rinna Yi
(74) *Attorney, Agent, or Firm* — Schwabe Williamson & Wyatt

(57) ABSTRACT

In embodiments, a method may include displaying a user interface comprising at least two windows, a first window displaying a live chat with a first individual and at least one of the remaining windows displaying content related to the live chat. The method may further include receiving an indication to pop-out the first window, and in response, displaying the first window as a separate moveable window, and displaying, within an original area of the first window, additional content related to one of the live chat or the first individual. The method may further include receiving an indication from a user to change the live chat to be with a second individual, and in response to the indication: displaying the live chat with the second individual in the separate moveable window; and displaying content related to the second individual in the at least one of the remaining windows.

21 Claims, 30 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0145608 A1* | 7/2004 | Fay ............... G06Q 10/10 715/758 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0208802 A1* | 9/2007 | Barman ............ G06Q 10/10 709/203 |

(56) References Cited

U.S. PATENT DOCUMENTS

| | | |
|---|---|---|
| 2008/0249972 A1 | 10/2008 | Dillon |
| 2009/0049385 A1 * | 2/2009 | Blinnikka .............. G06F 3/0481 |
| | | 715/719 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0282421 A1 * | 11/2009 | Jaffer ................ G06Q 10/06398 |
| | | 719/317 |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0159349 A1 * | 6/2012 | Kansky ................ H04L 51/046 |
| | | 715/752 |
| 2012/0233137 A1 | 9/2012 | Jakobson et al. |
| 2012/0290407 A1 | 11/2012 | Hubbard et al. |
| 2013/0055113 A1 * | 2/2013 | Chazin ................ H04L 12/1822 |
| | | 715/758 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2013/0268837 A1 * | 10/2013 | Braithwaite ........... G06Q 10/10 |
| | | 715/234 |
| 2014/0359537 A1 | 12/2014 | Jackobson et al. |
| 2014/0365957 A1 * | 12/2014 | Louch .................. G06F 3/1431 |
| | | 715/790 |
| 2016/0036649 A1 * | 2/2016 | Kansky ................ H04L 51/046 |
| | | 715/752 |

* cited by examiner

Create Case

Case Information

Case Owner
Jason Dewar —— 1643

Case Number

Contact Name
☐ Taylor Watson-Rice ✕  —— 1640

Account Name
Search Accounts

User
Search People chatKey

Entitlement Name
1-Year Extended Warranty —— 1645

Asset
Amazon Echo Dot

Additional Information

* Status
Working

Type
Warranty Upgrade

Cancel    Save

Live Chat with Taylor —— 1615

1600

1601 — ☐ Case
⊙ Chat

Notes
Online
Omni-Channel

LIVE AGENT CHAT CONSOLE

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The technology relates to interactive on-line customer service communications, and more specifically to systems, methods and computer readable media for changing the context of a user interface when a customer service agent changes the customer he is serving in a live online chat.

BACKGROUND

Customer service representatives who handle online chats often handle multiple chats at once. Besides the fact that this may be stressful, multiple ongoing chats may be difficult to manage. In fact, the more records an agent has to sift through for one case, the longer it may take that agent to solve all of the cases at hand.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 12 illustrates a magnified view of the My Chats window and the popped-out chat window of FIG. 11, according to some implementations.

FIG. 13A illustrates the user interface main display and the popped-out chat window of FIG. 12, after the agent has changed to a new active chat, according to some implementations.

FIG. 13B illustrates the user interface main display and the popped-out chat window of FIG. 12, after the agent has changed to a new active chat, according to alternate implementations.

FIG. 13D illustrates the user interface main display and two popped-out chat windows of FIG. 13B, after the agent has changed the active chat back to customer "Andy Martinez", according to alternate implementations.

FIG. 16 illustrates a Create Case window resulting from the customer service agent interacting with the "New Case" button of FIG. 15, according to some implementations.

FIG. 17 illustrates the information regarding the new case displayed in the Case Detail component of the Customer Information window of the user interface, according to some implementations.

FIG. 19 illustrates an example screen shot of an example customer service agent's user interface main display according to alternate implementations.

FIG. 21 illustrates the agent having popped-out the Current Conversations window of FIG. 20, and clicking on the "raise flag" button of the popped out window to ask a supervisor for help, according to some implementations.

DETAILED DESCRIPTION

Figure 1A:
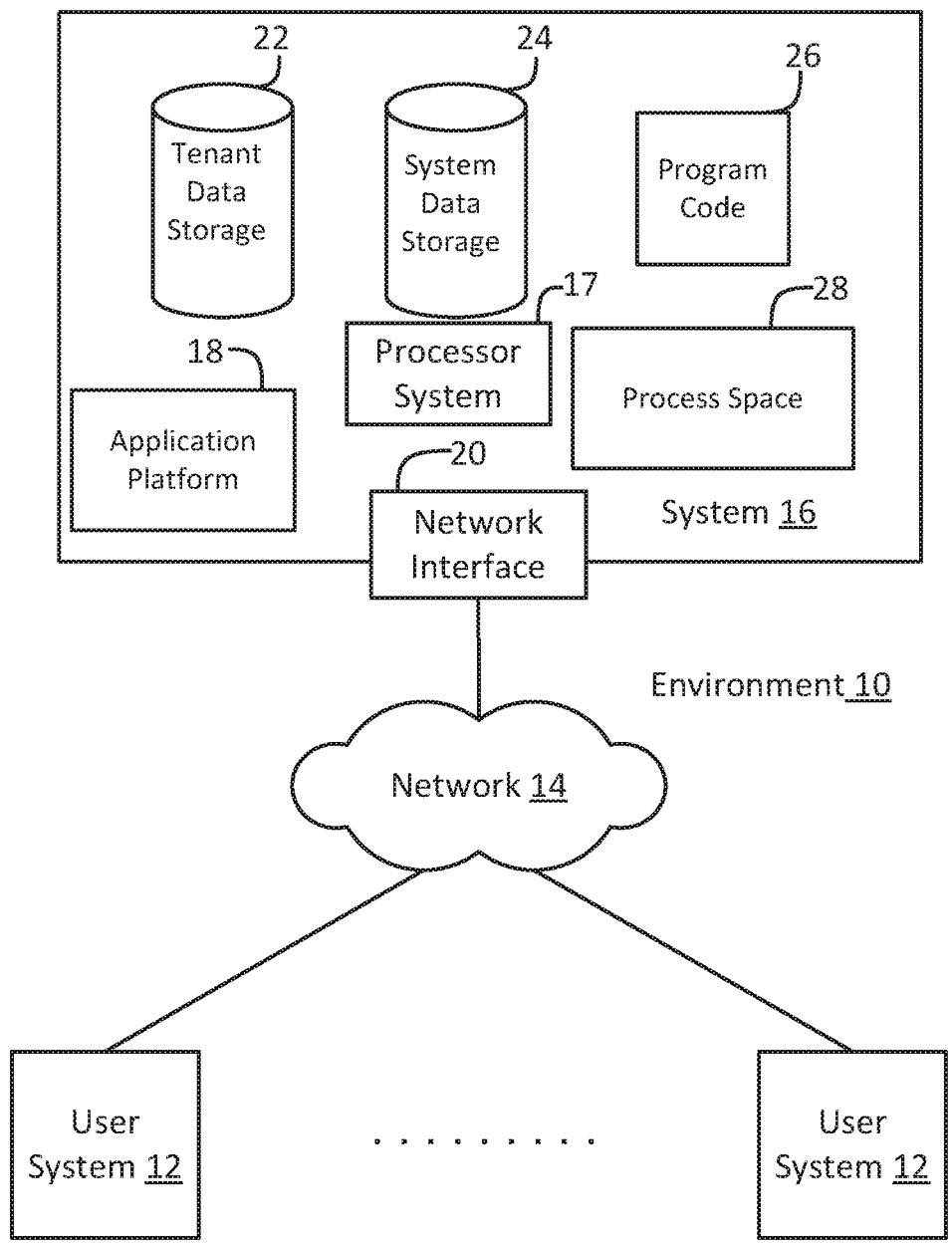
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for dynamically updating emails.

A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases.

The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc.

The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers to describe problems and vocabularies used in articles to describe solutions to those problems.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

Example System Overview

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
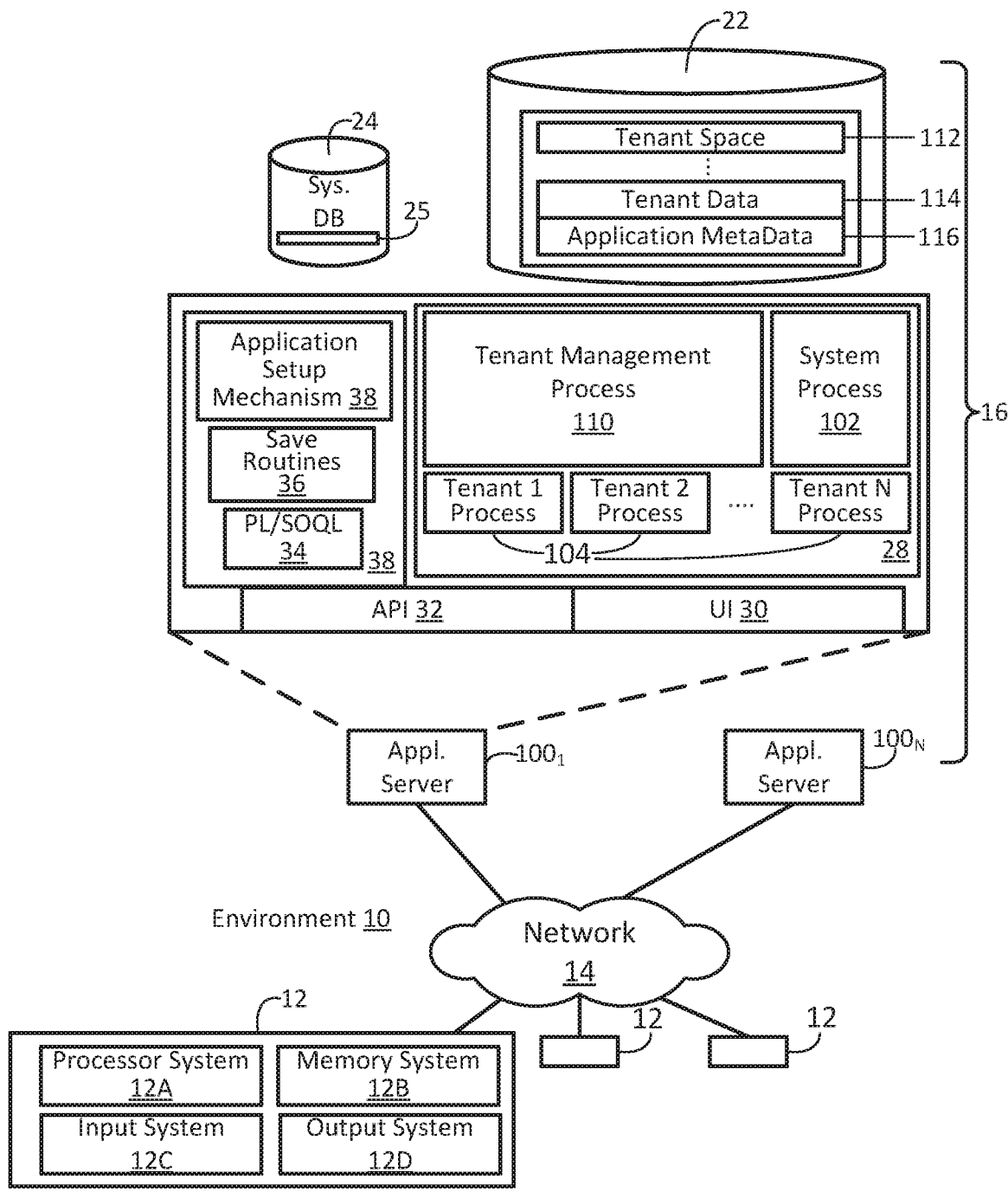
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

In embodiments, a method may include displaying a user interface comprising at least two windows, a first window displaying a live chat with a first individual and at least one of the remaining windows displaying content related to the live chat. The method may further include receiving an indication to pop-out the first window, and in response, displaying the first window as a separate moveable window, and displaying, within an original area of the first window, additional content related to one of the live chat or the first individual. The method may further include receiving an indication from a user to change the live chat to be with a second individual, and in response to the indication: displaying the live chat with the second individual in the separate moveable window; and displaying content related to the second individual in the at least one of the remaining windows.

In embodiments, a computer program may be stored on a storage medium for interactively displaying content. The computer program may include a set of instructions operable to cause a computer to cause a user interface to display at least two windows, a first window displaying a live chat with a first individual and at least one of the remaining windows displaying content related to the live chat. The instructions may be further operable to receive a first indication to pop-out the first window, and in response to the first indication, cause the first window to be displayed as a separate moveable window, and cause to be displayed, within an original area of the first window, additional content related to one of the live chat or the first individual. In embodiments, the instructions may be further operable to receive a second indication from a user to change the live chat to be with a second individual, and in response to the indication, cause the live chat with the second individual to be displayed in the separate moveable window, and cause content related to the second individual to be displayed in the at least one of the remaining windows.

Figure 2:
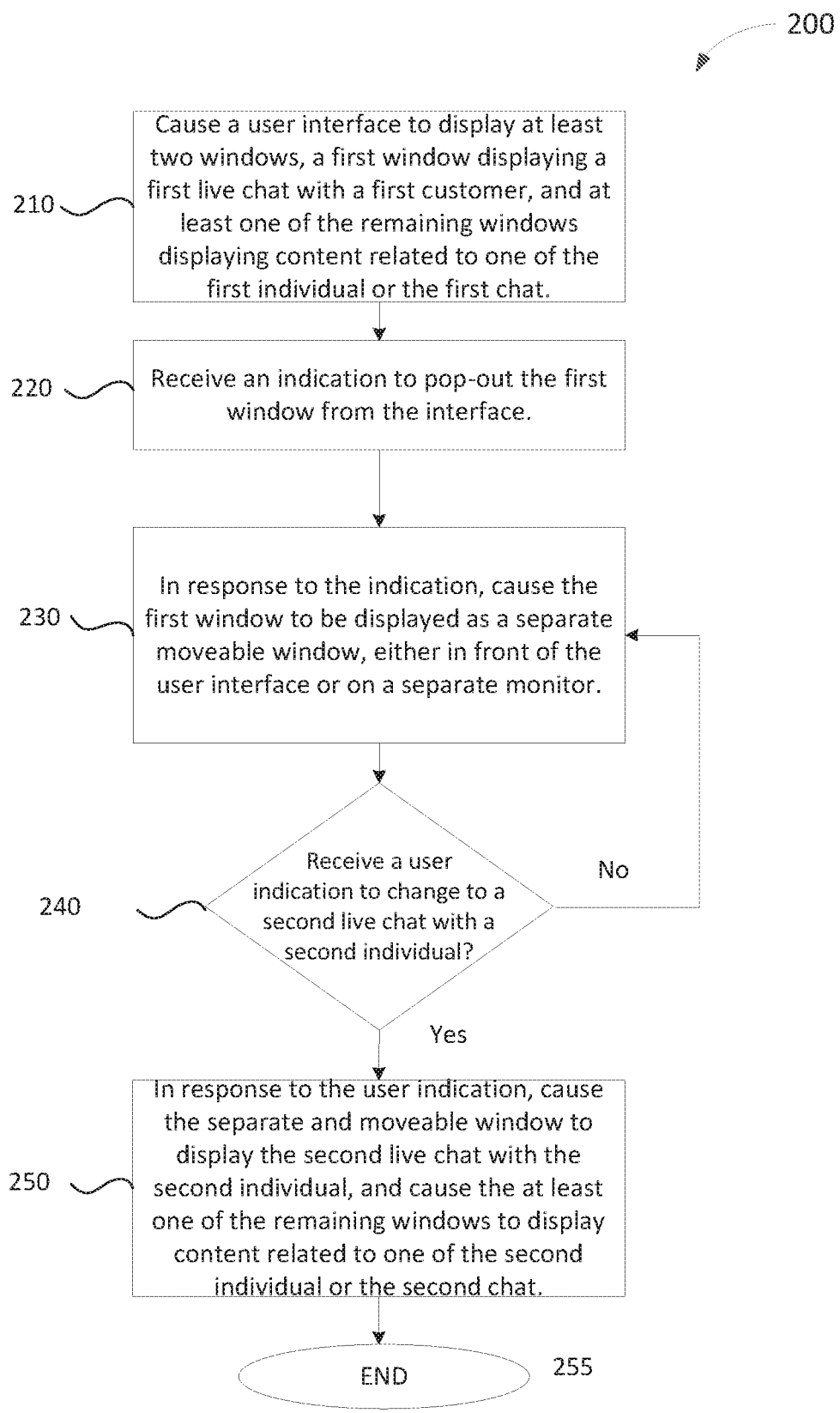
FIG. 2 shows an example process for popping out a chat window from a user interface, changing chat customers and preserving context according to some implementations.

FIG. 2 shows an example process for popping out a chat window from a user interface (UI), changing chat customers and preserving context according to some implementations. With reference thereto, operational flow for a process 200 of popping out a window from a UI comprising at least two adjacent windows is illustrated. It is noted that for ease of understanding, the following description of process 200 will make reference to various ones of FIGS. 6-13C, which illustrate example screen shots according to various embodiments.

Figure 6:
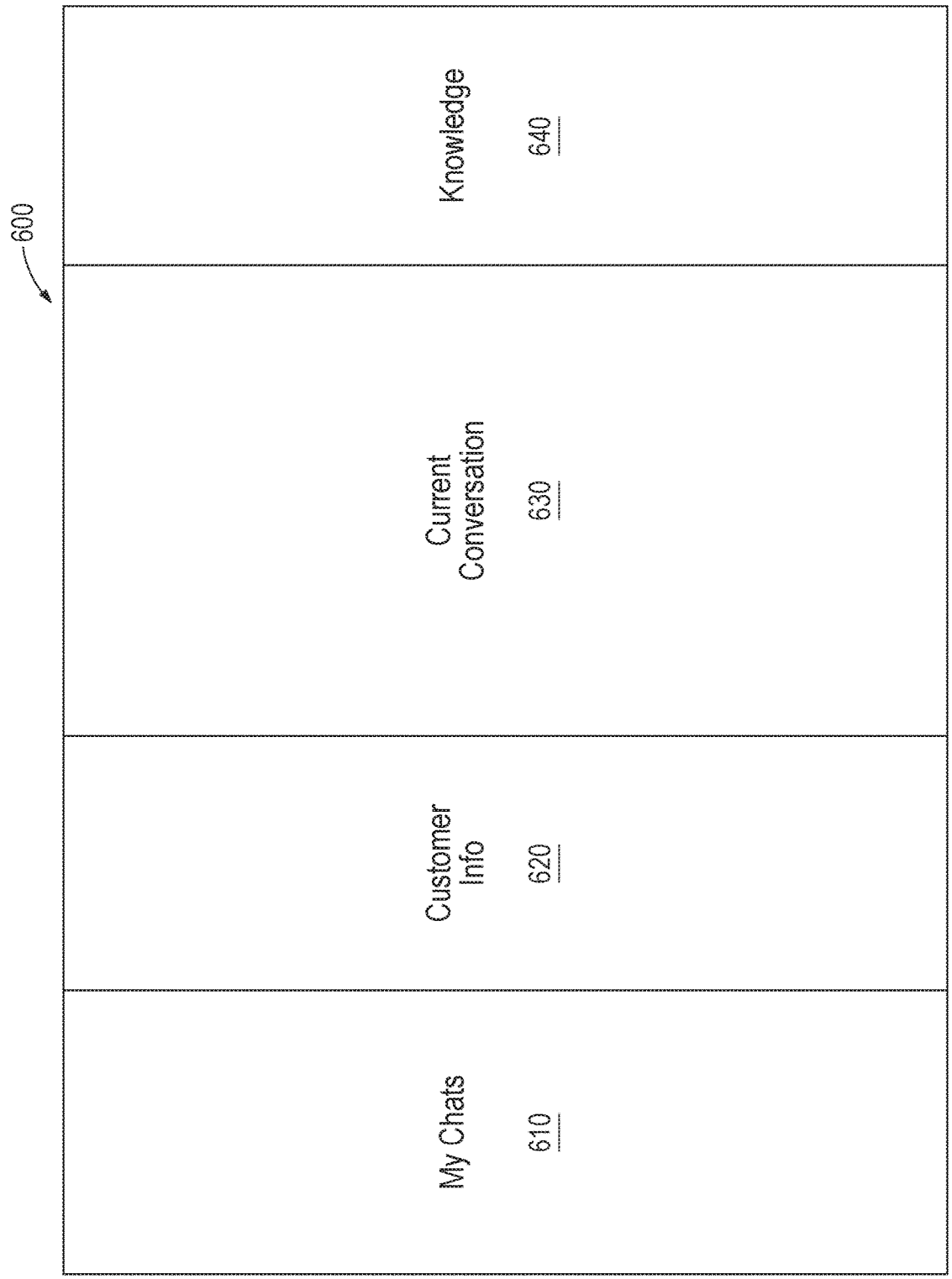
FIG. 6 illustrates an example screen shot of an example customer service agent's user interface, according to some implementations.
Figure 7:
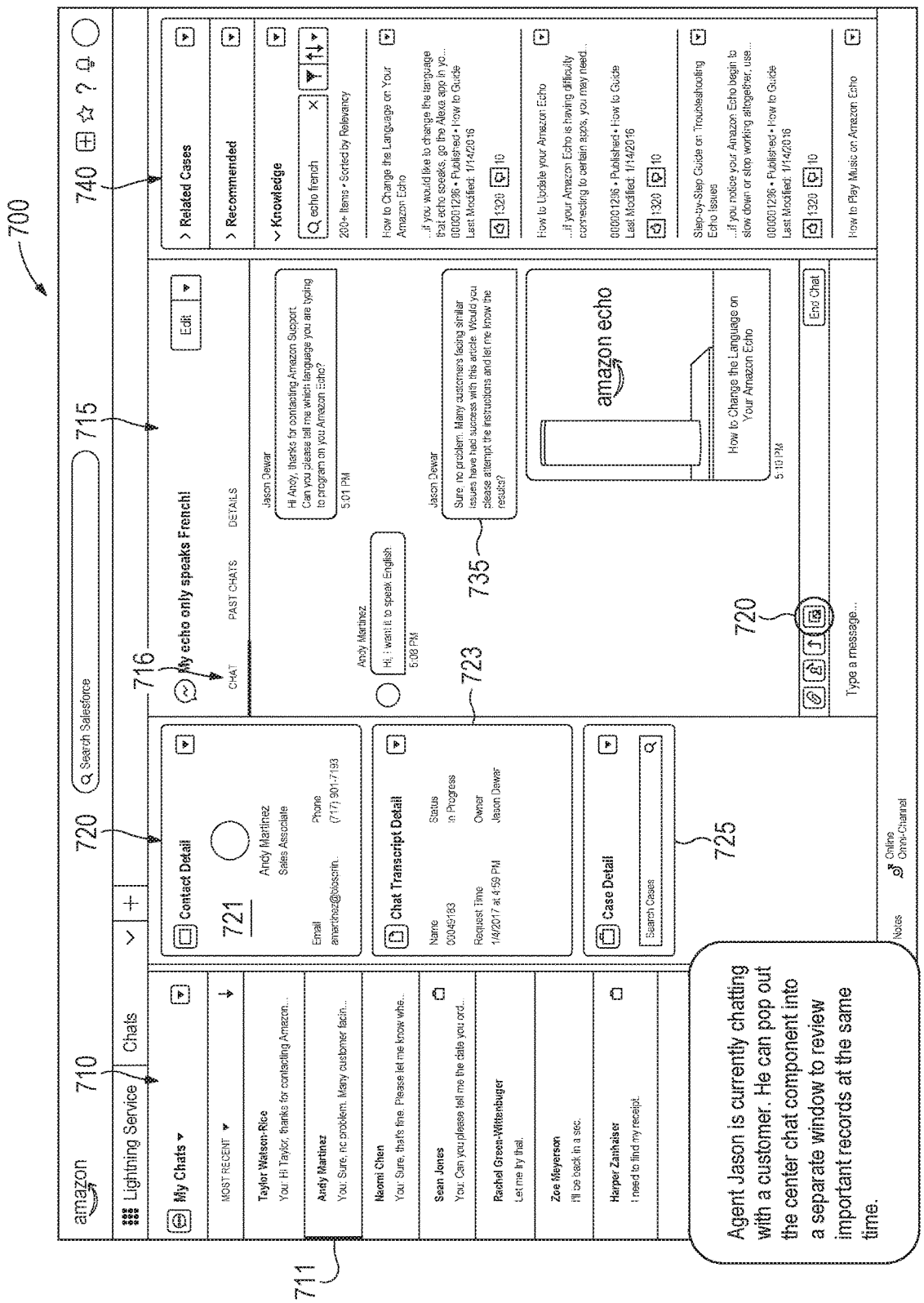
FIG. 7 illustrates detail of the four windows comprising the example user interface of FIG. 6, according to some implementations.

As illustrated, process 200 may include operations performed at blocks 210-255. In embodiments, the operations may be performed by User System 12 of FIG. 1A, for example, when accessing System 16. Continuing with reference to FIG. 2, process 200 may begin at block 210. At block 210, a device, such as User System 12 of FIG. 1A, may cause a UI to display at least two windows, a first window displaying a first live chat with a first individual, and at least one of the remaining windows displaying content related to one of the first individual or the first chat. An example of such a UI is shown in FIGS. 6 and 7. The user interface 600 or 700 may present relevant information to a user, who, in embodiments, may be a customer service representative or agent. Additionally, the user interface may, for example, provide an environment in which multiple customer chats may be conducted by the customer service representative or agent, with only one of them being the "live" chat at any given time. It is understood that, as used herein, and in the claims, a "live" or "active" chat is the chat in which the agent is currently messaging. In embodiments, multiple customer chats may be conducted substantially simultaneously, where an agent may switch between several chats as new messages are respectively posted in the chats by the respective individuals involved. An example of this is described below in connection with FIGS. 12 and 13A-13C. Thus, when the agent switched between chats, the new chat becomes the "live" chat.

From block 210 process 200 may proceed to block 220, where the device may receive an indication to pop out the window of the UI that is displaying the live chat. The window may be, for example, Current Conversation window 715 of FIG. 7, or the like. It is noted that a window displaying an active chat, sometimes referred to herein as a "chat window", is understood to be a window or other element of a UI which displays messages exchanged between two or more parties. Chat windows are commonly used in UIs of websites or programs that allow a customer or potential customer of a business or entity to engage in on-line conversations with a customer service representative of the business or entity. In embodiments, each party to the chat may see a chat window interface in which they may type messages, attach or send images or audio files, embed links to such content, or the like. As shown in FIG. 7, Current Conversations window 715 displays a current live chat 716 between customer service agent Jason Dewar and a first customer Andy Martinez. This is also indicated by the highlighted sub-window 711 of My Chats window 710, which shows the beginning of the last message in the chat, as shown in full at 735.

Continuing with reference to block 220 of FIG. 2, it is noted that an indication to pop-out the chat window may be communicated to the device in various ways, such as, for example, the user clicking on a button or widget, speaking a command, typing in a command or code for a command, or the like. For example, a user may communicate such a command by clicking or engaging with a pop-out button, such as, for example, button 820 in FIG. 8.

Alternatively, the indication may be automatic, generated by the device itself. This "automatic pop-out" may be set by one or more system parameters. For example, the chat shown in the bottom of Current Conversations window 715 of FIG. 7 may be set to automatically pop-out as a separate window after a pre-defined time has elapsed in the chat.

From block 220, process 200 may proceed to block 230, where the device, in response to the indication, may cause the first window to be displayed as a separate moveable window, either in front of the UI or on a separate monitor.

In some embodiments, following the first window being popped-out, a device may "fill the hole" left by the popping out of the chat window by displaying additional content related to the first live chat in the area of the Current Conversations window previously occupied by the display of the live chat. In embodiments, the additional content may include, for example, past chats with the first individual, or, for example, details relevant to the live chat or the first individual. An example of this is shown in window 930 of FIG. 9, which now displays, in the former "live chat" portion of the window, past chats 919 with customer "Andy Martinez" while the live chat with Andy Martinez is displayed in now popped-out live chat window 915. As may be seen, a user may choose whether past chats are displayed, or other details 917 are displayed, once the live chat is displayed in separate moveable window 915.

Figure 9:
FIG. 9 illustrates the result of the agent activating a pop-out button, where the current conversation window of FIG. 8 floats over the revised main display, according to some implementations.

It is here noted that in the embodiment shown in FIG. 9, for example, when the live chat component is "popped-out" by a user, the space previously occupied by the component in the console may be filled with any components from the same column which were below the popped out component. In other words the rest of the column slides to fill the space. Thus, one sees previous messages in the current chat, and then prior chats with the same individual, as shown in FIG. 9, where the most current messages are shown at the top of the space.

From block 230, process 200 may proceed to query block 240, where the device may determine if it has received a user indication to change to a second live chat with a second individual. For example, as noted, a customer service agent may simultaneously hold several ongoing chats with customers, the one he currently responds to being known as the "live" or "active" chat. This may be an efficient use of time where, for example, the customer service agent proposes solutions to a given individual to go and try to resolve their problem or issue, or, for example, where the customer service agent has previously sent instructions, or links to instructions, for a customer to read, and there is some lag time before the individual reports back via a new chat message. In such situations, rather than just wait, the customer service agent may change the live chat to one of the other ongoing chats, where, for example, an individual from a previously live (but still ongoing) chat may post a new message for the customer service agent.

Figure 11:
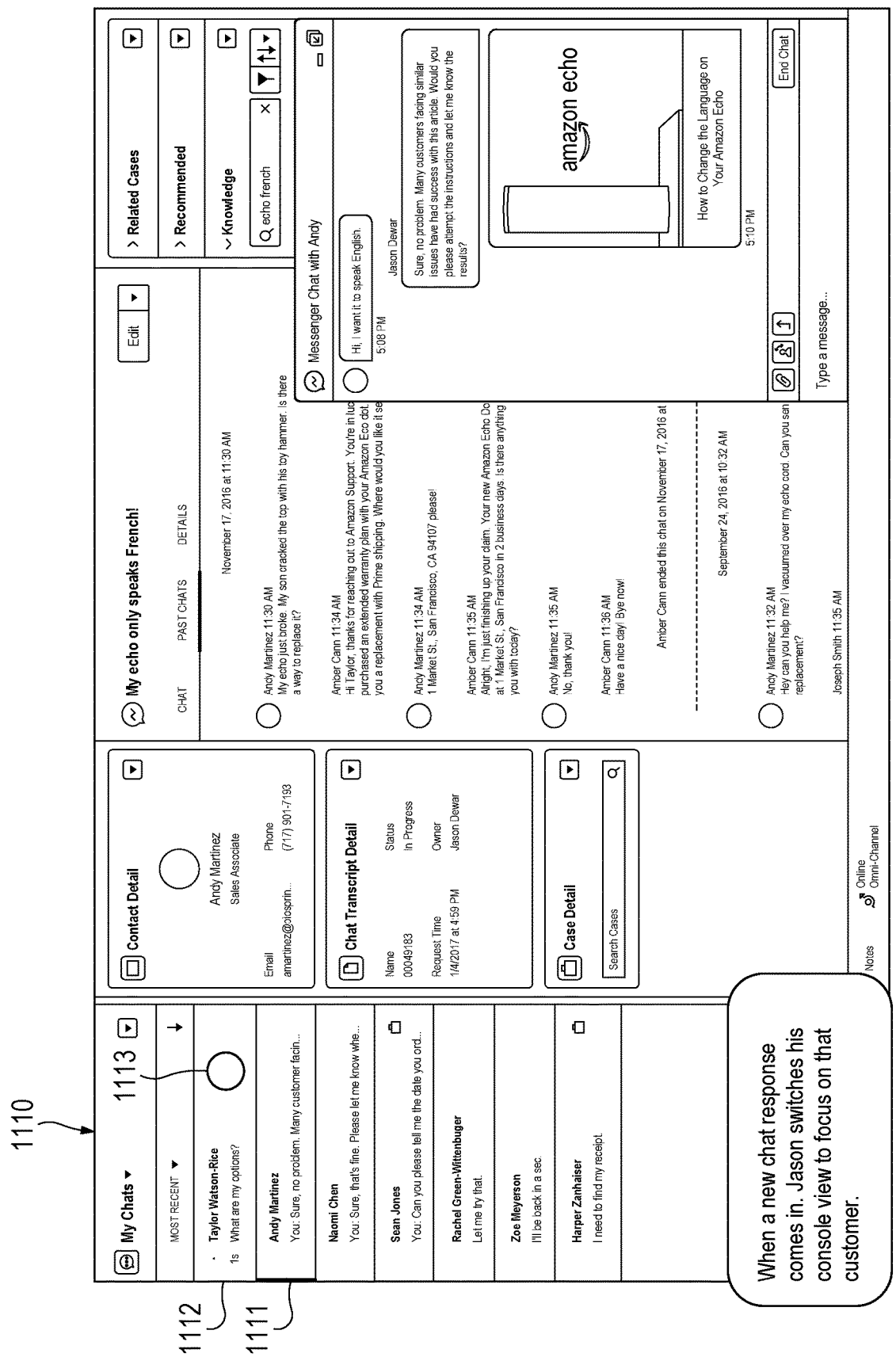
FIG. 11 illustrates a new message coming in for one of the agent's live chats, according to some implementations.
Figure 13A:
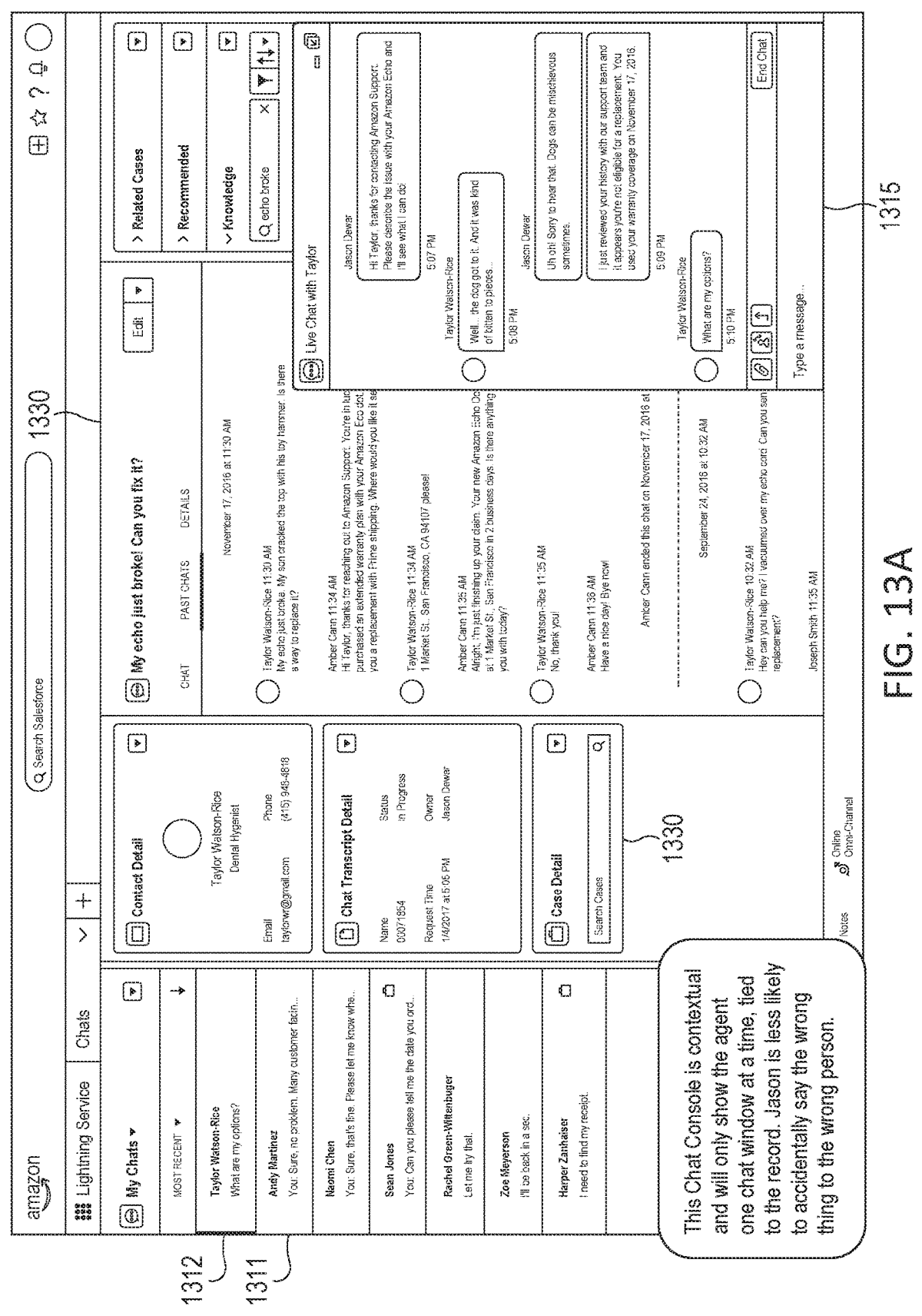

Thus, when such a new message is seen by the customer service agent in the UI, he or she may leverage a lull or lag in their current live chat, and may switch the live chat to the previous individual who sent the new message. In embodiments, the customer service agent may interact with the UI to signal such a change, such as, for example, is shown in FIGS. 11 and 13, where an agent, seeing a new message arrive from Taylor Watson-Rice, as shown, for example, by indicator 1113 of FIG. 11, switches his live chat (which is displayed in separate and moveable window 915) from individual Andy Martinez to individual Taylor Watson-Rice, by, for example, highlighting block 912 of the My Chats window of the UI. The result of this change by the customer service agent is shown, for example in FIG. 13A, where the live chat displayed in separate and moveable window 1315 is now that with Taylor Watson-Rice, and thus block 1312 in FIG. 13A is now highlighted, and block 1311 is now darkened or ghosted, as shown. In addition, as further shown in FIG. 13A, the various supporting fields in the entire UI which provide past chat messages, or additional contextual information about the individual in the current live chat, have now changed to relate to Taylor Watson-Rice.

Thus, in embodiments, in an example UI or component-based console, the separate components may integrate with each other, so that changes in one are automatically reflected in the contents of the others. This same connection may apply in embodiments, when one component is "popped out" of the console space itself. Thus, the separate and moveable window will continue to be integrated to the other workspace components.

Continuing with reference to FIG. 2, if at query block 240 the determination is "No", then process 200 may return to block 230, and continue displaying the live chat in the separate and moveable window, such as is shown, for example, in FIG. 9 with individual Andy Martinez in separate and moveable window 915 in FIG. 9.

However, if at query block 240 the determination is "Yes", and thus the user has changed live chat partners, then process 200 may proceed to block 250, where, in response to the user indication, the device may cause the separate and moveable window to display the second live chat with the second individual, and cause the at least one of the remaining windows to display content related to one of the second individual or the second chat, as described above in connection with FIGS. 9 and 13A. Following the change of the live chat individual, and the display of related content relevant to the new individual in remaining windows of the UI at block 250, process 200 may then end at block 255.

Figure 3:
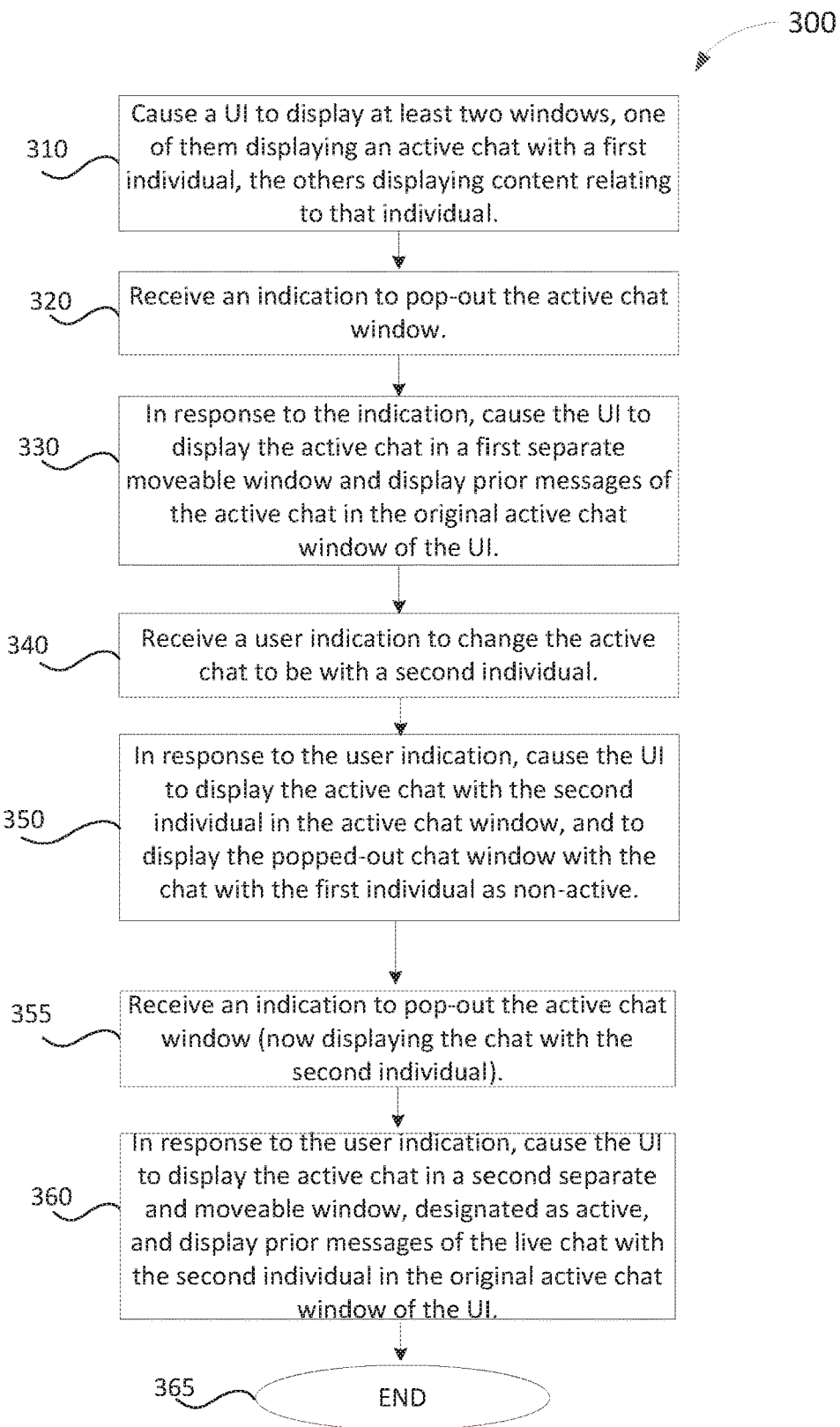
FIG. 3 shows an example process for popping out a first chat window from a user interface, changing chat customers and preserving context while allowing the first popped out chat window to remain displayed, according to some implementations.

FIG. 3 depicts operational flow for a process 300 of popping out a first chat window from a UI, changing chat customers and preserving UI context while allowing the first popped out chat window to remain displayed as inactive, according to some implementations. It is noted that for ease of understanding, the following description of process 300 will make reference to various ones of FIGS. 9, and 13B through 13C, and in particular which illustrate example screen shots according to various embodiments.

Referring now to FIG. 3, as illustrated, process 300 may include operations performed at blocks 310-360. In embodiments, the operations of process 300 may be performed by User System 12 of FIG. 1A, for example, when accessing System 16.

Continuing with reference to FIG. 3, process 300 may begin at block 310. At block 310, a device, such as User System 12 of FIG. 1A, may cause a UI to display at least two windows, one of them displaying an active chat with a first individual, and may cause the other windows to display content relating to the first individual. An example of such a UI is shown in FIGS. 6 and 7, as described above in connection with FIG. 2, which need not be repeated here.

From block 310 process 300 may proceed to block 320, where the device may receive an indication to pop out the window of the UI that is displaying the active chat. The window may be, for example, Current Conversation window 715 of FIG. 7, or the like. As noted above in connection with FIG. 2, Current Conversations window 715 displays a current live chat 716 between customer service agent Jason Dewar and a first individual Andy Martinez. This is also indicated by the highlighted sub-window 711 of My Chats window 710, which shows the beginning of the last message in the chat, as shown in full at 735.

Continuing with reference to block 320 of FIG. 3, it is noted that an indication to pop-out the chat window may be communicated to the device in various ways, such as, for example, the user clicking on a button or widget, speaking a command, typing in a command or code for a command, or the like. For example, a user may communicate such a command by clicking or engaging with a pop-out button, such as, for example, button 820 in FIG. 8.

Alternatively, the indication may be automatic, generated by the device itself. This "automatic pop-out" may be set by one or more system parameters. For example, the chat shown in the bottom of Current Conversations window 715 of FIG. 7 may be set to automatically pop-out as a separate window after a pre-defined time has elapsed in the chat. This automatic pop-out may occur for specified issue types or by user preference. For example, the user may configure that whenever a chat conversation is started, automatically pop out the component. Or, for example, it may only pop-out when a certain amount of time has elapsed in the chat, to not needlessly clutter the UI for very short, easily resolved chats. Either of these example parameters may, in embodiments, be stored as a UI default for all cases of a certain type or as a user preference.

From block 320, process 300 may proceed to block 330, where the device, in response to the indication, may cause the UI to display the active chat in a first separate moveable window, and display prior messages of the active chat in the original active chat window of the UI, as shown, for example, in FIG. 9, and as discussed above in connection with FIG. 2.

From block 330, process 300 may proceed to block 340, where the device may receive a user indication to change the active chat to be with a second individual. From block 340, process 300 may proceed to block 350, where the device, in response to the user indication, may cause the UI to display the active chat with the second individual in the active chat window, and to display the popped-out chat window with the chat with the first individual as non-active. This is shown, for example, by comparison of FIGS. 9 and 13B.

Figure 13B:
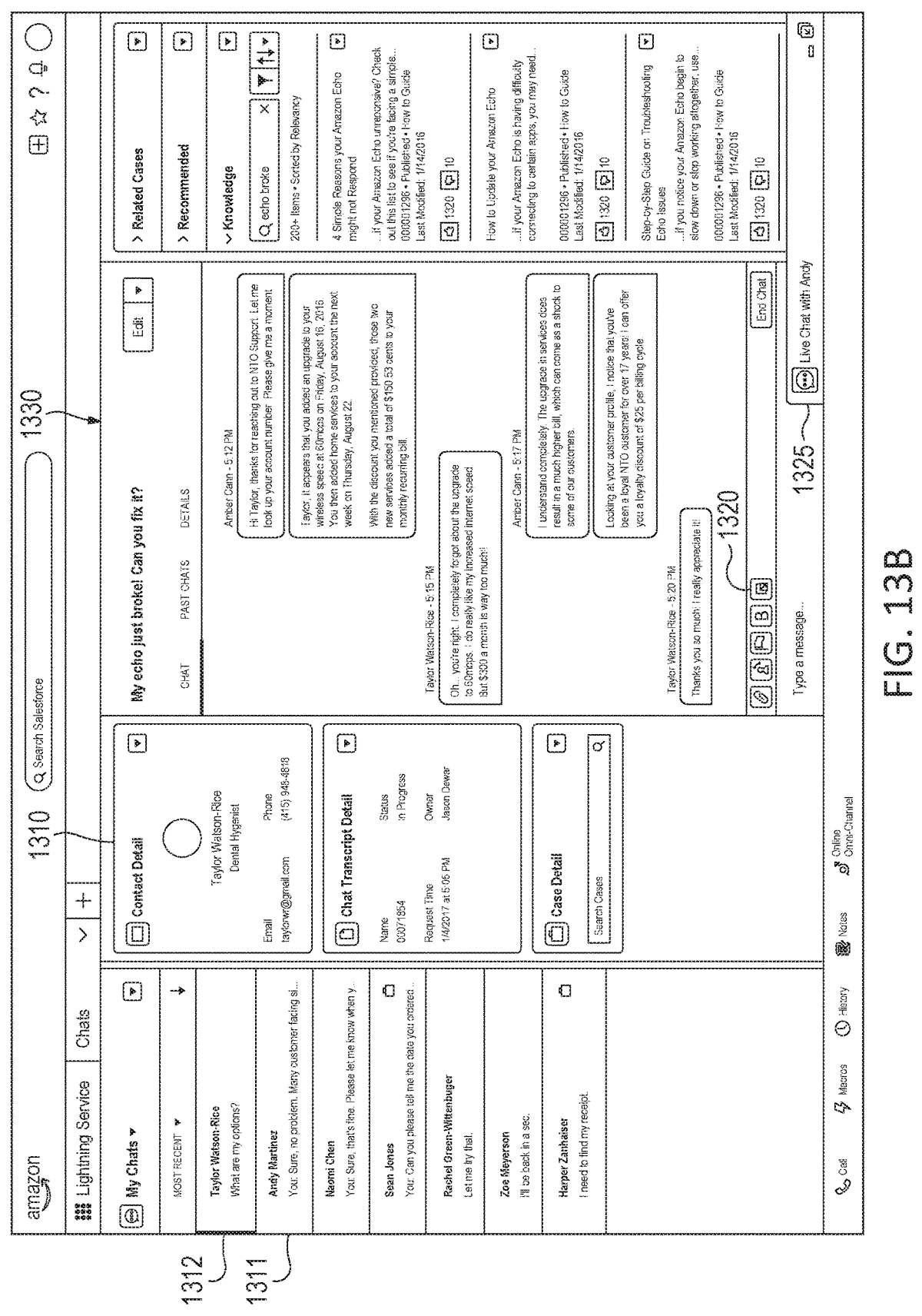

In these examples, an agent, seeing a new message arrive from Taylor Watson-Rice, as shown, for example, by indicator 1113 of FIG. 11, may switch his live chat (which is displayed in separate and moveable window 915) from first individual Andy Martinez to individual Taylor Watson-Rice, by, for example, highlighting block 912 of the My Chats window of the UI. The result of this change by the customer service agent is shown, for example in FIG. 13B, where the live chat is displayed in a bottom portion of My Conversations window 1330, and is now with individual Taylor Watson-Rice, and thus block 1312 in FIG. 13B is now highlighted, and block 1311 is now darkened or ghosted, as shown. In addition, as further shown in FIG. 13B, the various supporting fields in the entire UI which provide past chat messages, or additional contextual information about the individual in the current live chat, have now changed to relate to Taylor Watson-Rice.

Finally, as also shown in FIG. 13B, separate moveable window 1325, which continues to display messages from the previous live chat with Andy Martinez, is shown as inactive, as the banner across its top is shown in grey. Thus, in embodiments such as are shown in FIG. 13B, when a user switches to a new chat, the existing pop out may not change, and rather, may continue to be displayed, but may be displayed to indicate that is has been is deselected (such as, for example, by being shown in grey frame), and the chat window 1330 may show the new chat (in this example, with Taylor Watson-Rice). In such embodiments, the agent may pop out the new active chat from widow 1330 into a second separate moveable window as well, of course, but that must be affirmatively done. Or, alternatively, if a parameter is set for a time-elapsed automatic pop-out, that may occur as well, in embodiments. Thus, in these alternate embodiments, in contrast to the process of block 250 of FIG. 2, each time a user selects a new active chat, it may first appear only as not popped out, and the content of any already popped-out chat window is not changed, and the previously popped-out window continues to be displayed, only the window itself may be shown as inactive.

Continuing with reference to FIG. 3, from block 350, process 300 may proceed to block 355, where, the device may receive an indication to pop out the window of the UI that is displaying the active chat, which is now with the second individual.

Figure 13C:
FIG. 13C illustrates the user interface main display and two popped-out chat windows, after the agent has popped out the active chat window (with the new active chat), according to alternate implementations.

From block 355, process 300 may proceed to block 360, where the device, in response to the indication, may cause the UI to display the active chat in a second separate moveable window, and display prior messages of the active chat (here with the second individual) in the original active chat window of the UI, as shown, for example, in FIG. 13C. As shown in FIG. 13C, a second separate moveable window 1327 is now displayed, in response to the indication. Thus, there are now two separate moveable windows: a second, now active, separate moveable window 1327, with an active banner 1329 (shown in a darker color), indicating that it is the active live chat window, and first separate moveable window 1325, with an inactive banner 1339 (shown in a greyed or lighter color), indicating that it is an inactive window showing messages from a prior chat. Finally, prior messages of the active chat (here with the second individual Taylor Watson-Rice) are displayed in the original active chat portion 1331 of the Current Conversation window 1330 of UI 1300C, as shown.

As noted above, an indication to pop-out the chat window may be communicated to the device in various ways, such as, for example, the user clicking on a button or widget, speaking a command, typing in a command or code for a command, or the like. For example, a user may communicate such a command by clicking or engaging with a pop-out button, such as, for example, button 1320 in FIG. 13B. Alternatively, the indication may be automatic, generated by the device itself, as described above, after a chat lasts for a certain amount of time. In this regard, it is noted that in the example embodiments of FIGS. 13B through 13D, there would not be an automatic pop-out of the live chat when it begins. This so as not to clutter the UI with numerous separate moveable windows each time a user changes the live chat, inasmuch as all previous popped out windows remain displayed, albeit inactive, upon a change of live chat individuals.

Finally, from block 360, process 300 may proceed to block 365, where it may terminate.

Figure 3A:
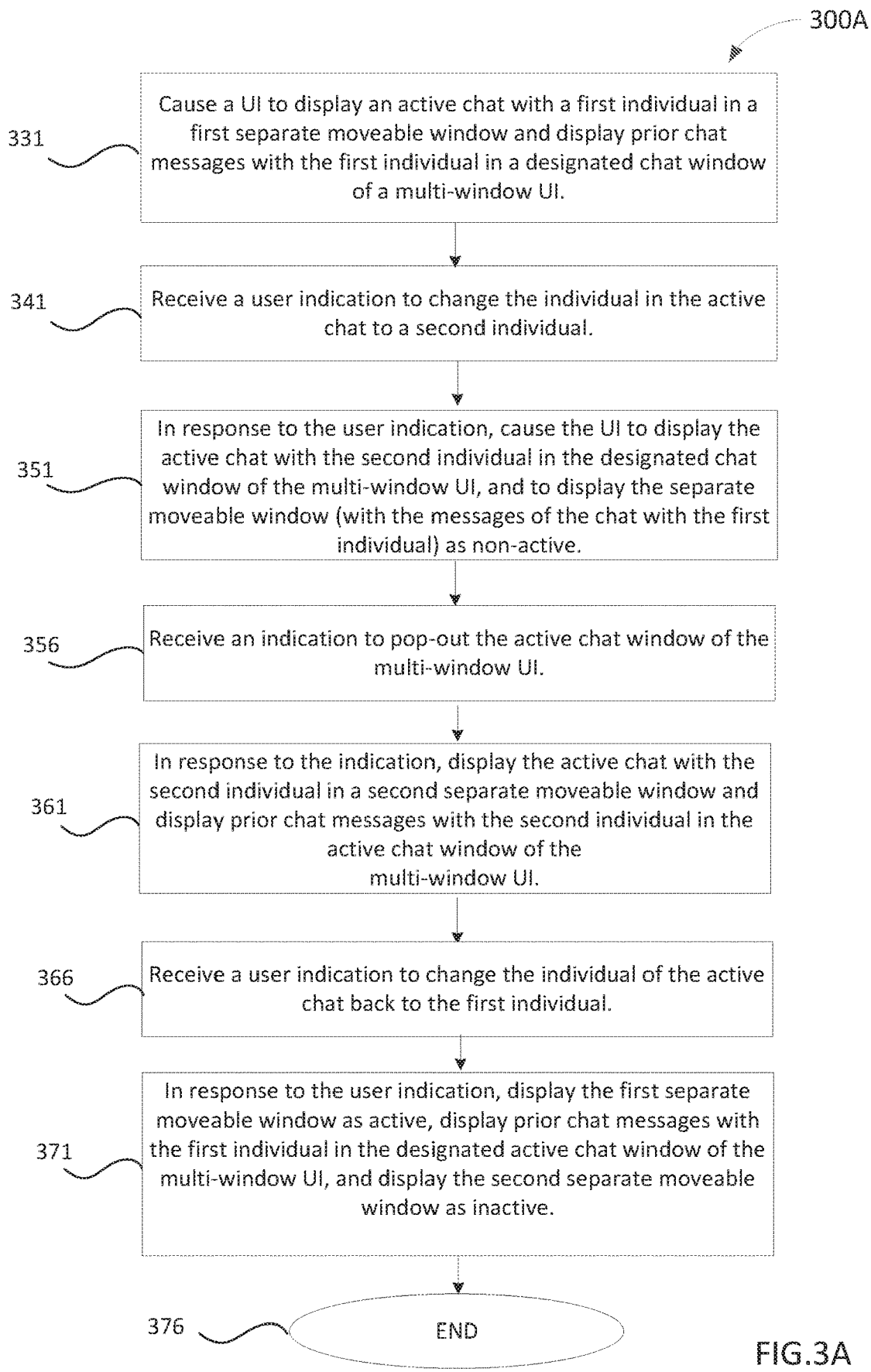
FIG. 3A shows an enhanced version of the example process of FIG. 3 further including switching an active chat between multiple popped out chat windows, according to some implementations.

Referring now to FIG. 3A, as illustrated, process 300A may include operations performed at blocks 331-376. In embodiments, the operations may be performed by User System 12 of FIG. 1A, for example, when accessing System 16. In embodiments, process 300A is an enhanced version of the example process 300 of FIG. 3, where process 300A further includes switching an active chat between multiple popped out chat windows, according to some implementations.

It is noted that blocks 331 through 361 of process 3A are completely analogous to blocks 330 through 360, respectively, of process 300, and need not be further described. Thus, after processing block 361, (analogous to block 360 of process 300) the device may display the active chat with the second individual in a second separate moveable window, and display prior chat messages with the second individual in the active chat window of the multi-window UI. As noted above, this situation is illustrated, for example, in FIG. 13C.

The noteworthy aspects of process 300A begin at block 366. Thus, from block 361, process 300A may proceed to block 366, where the device may receive a user indication to change the individual of the active chat back to the first individual. Thus, in the example of FIGS. 13B through 13D, the situation following processing of block 361 of FIG. 3A is illustrated in FIG. 13C, where there are two separate moveable windows: a second, now active, separate moveable window 1327, with an active banner 1329 (shown in a darker color), indicating that it is the active live chat window, which displays message sin a live chat with Taylor Watson-Rice, and a first separate moveable window 1325, with an inactive banner 1339 (shown in a greyed or lighter color), indicating that it is an inactive window, showing messages from the prior chat with first individual Andy Martinez. The user indication at block 366 now requests the device to change back to a live chat with Andy Martinez.

In embodiments, the user indication to change the individual in the live chat may be performed using any of the methods as described above, or, for example, may be performed simply by a user clicking anywhere within an inactive separate and moveable window, if the individual desired to now be in the live chat was previously in a live chat with the user, and thus an inactive separate and moveable window is still being displayed for that individual. In embodiments, where a user is more or less in a round robin situation with, say, three individuals, the user may, in embodiments, easily change form one live chat to another simply by activating one of the displayed inactive separate moveable windows.

From block 366, process 300A may proceed to block 371, where the device may, in response to the user indication, display the first separate moveable window as active, display prior chat messages with the first individual in the designated active chat window of the multi-window UI, and display the second separate moveable window as inactive. This is illustrated, for example, in FIG. 13D, where now first separate moveable window 1339, displaying a live chat with Andy Martinez, may be displayed as active (as seen by darker banner 1339), and prior messages of the active chat (here with the first individual Andy Martinez) are displayed in the original active chat portion 1331 of the Current Conversation window 1330 of UI 1300D, as shown. Finally, UI 1300D may display second separate moveable window 1327, which displays messages with now prior chat individual Taylor Watson-Rice, as inactive (as seen by grey or ghosted banner 1329).

Finally, from block 371, process 300A may proceed to block 376, where it may terminate.

It is here noted that by the example mechanisms as illustrated in FIGS. 3 and 3A, any number of separate moveable windows may be displayed, inasmuch as each time a user changes to a new individual for a live chat, the user may decide to pop-out that new window, as illustrated, for example, in FIGS. 13B and 13C. Thus, from the situation illustrated in FIG. 13C, the user may have decided not to return to a live chat with former live chat partner Andy Martinez, but to change to a live chat with another individual listed in the My Chats window 1311, and then pop out the live chat window, as per blocks 341 through 361 of FIG. 3A, thereby causing the UI to display a new separate moveable window with the new individual.

Figure 13D:
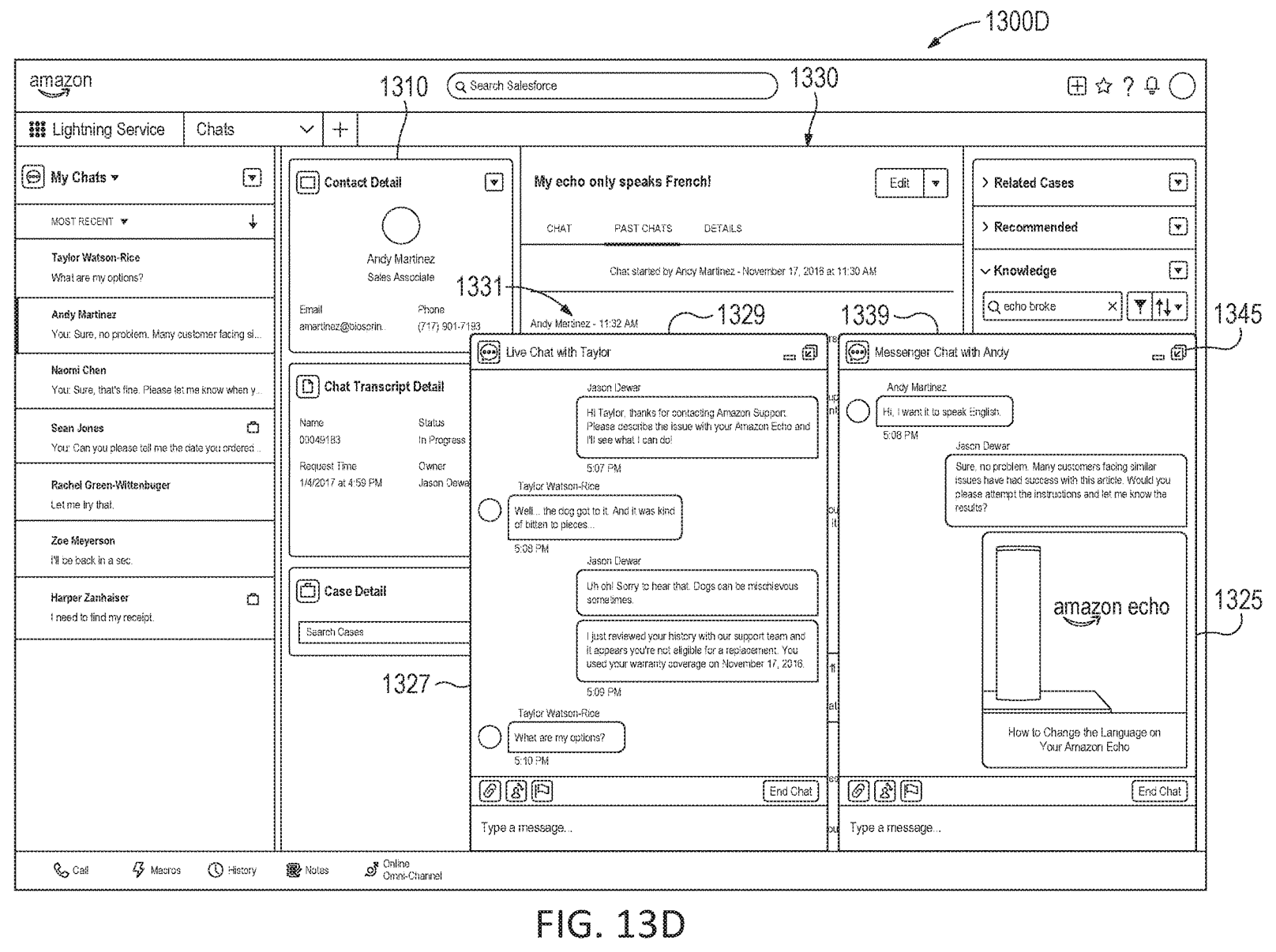

To clear the display monitor of such multiple windows, when a chat is finally over, and the individual's issue resolved, the user may pop the separate moveable window back in to the UI, such as, for example, by clicking on pop-in icon 925, as shown in FIG. 9, or pop-in icon 1345, as shown in FIG. 13D.

Figure 4:
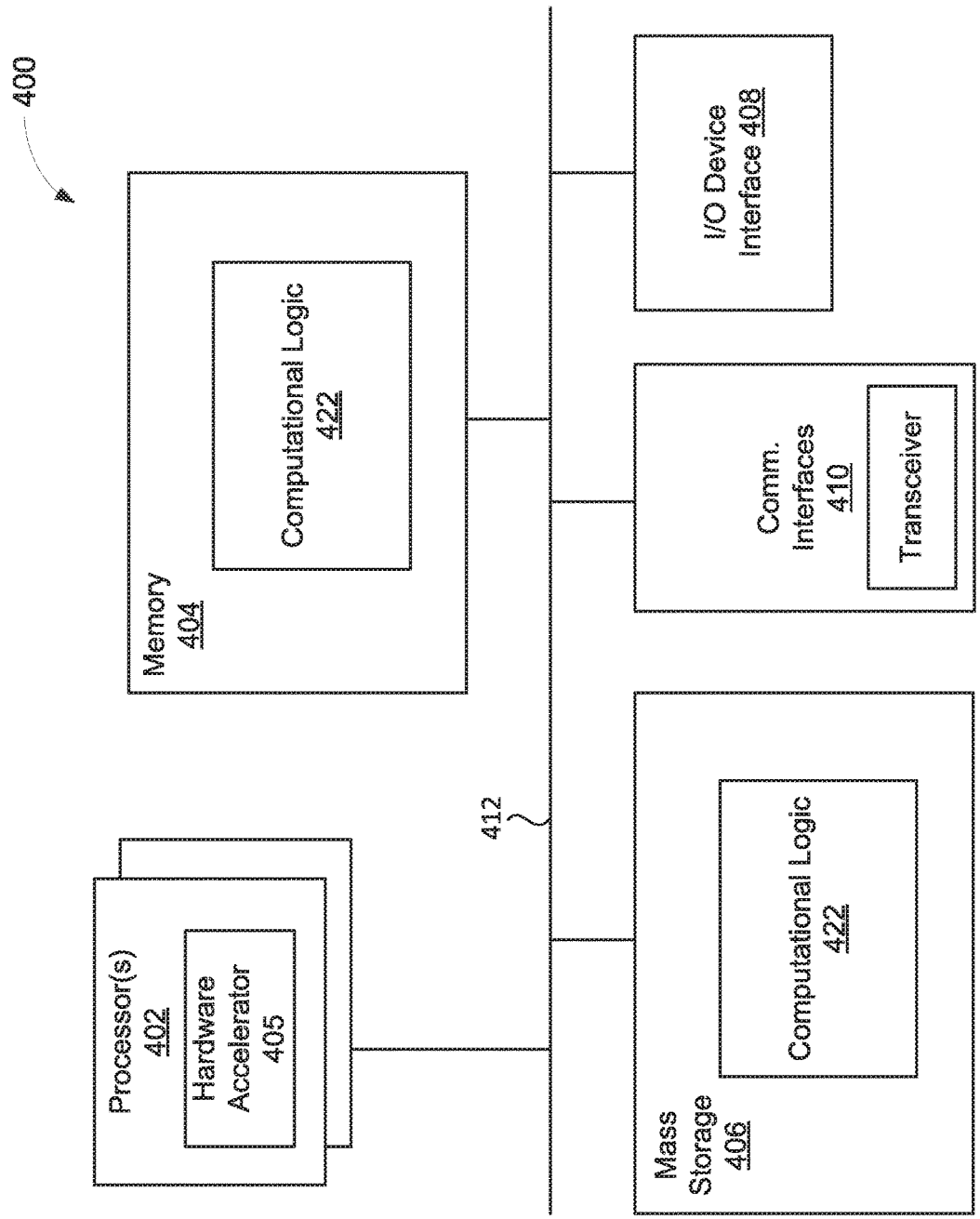
FIG. 4 illustrates a block diagram of a computer device suitable for practicing the present disclosure, according to some implementations.

Referring now to FIG. 4, wherein a block diagram of a computer device suitable for practicing the present disclosure, in accordance with various embodiments, is illustrated. As shown, computer device 400 may include one or more processors 402, memory controller 403, and system memory 404. Each processor 402 may include one or more processor cores and/or hardware accelerator 405. An example of hardware accelerator 405 may include, but is not limited to, programmed field programmable gate arrays (FPGA). Memory controller 403 may be any one of a number of memory controllers known in the art. System memory 404 may include any known volatile or non-volatile memory.

Additionally, computer device 400 may include mass storage device(s) 406 (such as solid state drives), input/output device interface 408 (to interface with various input/output devices, such as, mouse, cursor control, display device (including touch sensitive screen), and so forth) and communication interfaces 510 (such as network interface cards, modems and so forth). In embodiments, communication interfaces 510 may support wired or wireless communication, including near field communication. The elements may be coupled to each other via system bus 512, which may represent one or more buses. In the case of multiple buses, they may be bridged by one or more bus bridges (not shown).

Each of these elements may perform its conventional functions known in the art. In particular, system memory 404 and mass storage device(s) 406 may be employed to store a working copy and a permanent copy of the executable code of the programming instructions of an operating system, one or more applications, Web Browser 221, Extension 223, Email Server 231, Other 233, Message Hosting Module 241 and Notification Module 242, as well as each of their respective counterparts shown in the alternate system 200B of FIG. 2B, collectively referred to as computing logic 422. Extension 223, or alternatively Web Browser 221, or still alternatively Web Browser 221, in combination with Extension 223, may be configured to practice (aspects of) processes 200, 300 and 300A of FIGS. 2, 3 and 3A, described above. The programming instructions may comprise assembler instructions supported by processor(s) 402 or high-level languages, such as, for example, C, that can be compiled into such instructions. In embodiments, some of computing logic may be implemented in hardware accelerator 405.

The permanent copy of the executable code of the programming instructions or the bit streams for configuring hardware accelerator 405 may be placed into permanent mass storage device(s) 406 in the factory, or in the field, through, for example, a distribution medium (not shown), such as a compact disc (CD), or through communication interface 410 (from a distribution server (not shown)).

The number, capability and/or capacity of these elements 410-412 may vary, depending on the intended use of example computer device 400, e.g., whether example computer device 400 is a smartphone, tablet, ultrabook, a laptop, a server, a set-top box, a game console, a camera, and so forth. The constitutions of these elements 410-412 are otherwise known, and accordingly will not be further described.

Figure 5:
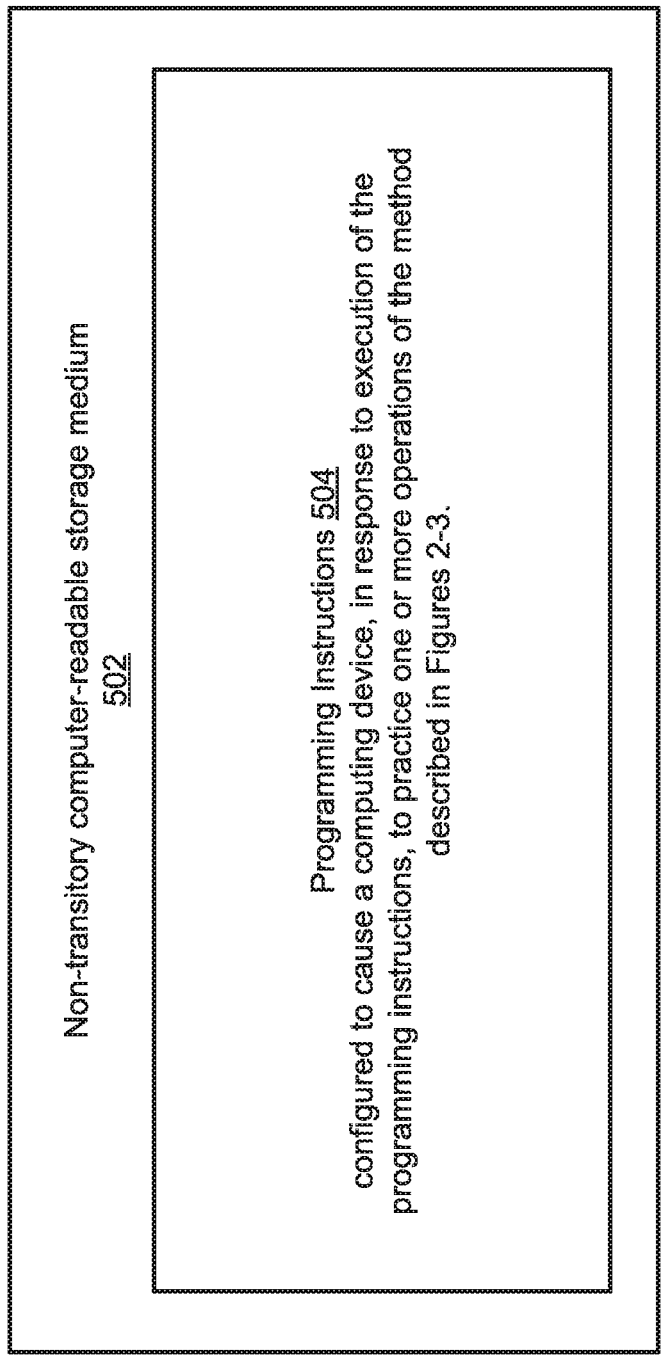
FIG. 5 illustrates an example computer-readable storage medium having instructions configured to practice aspects of the process of FIGS. 2 and 3, according to some implementations.

FIG. 5 illustrates an example computer-readable storage medium having instructions configured to implement all (or portion of) Web Browser 221, Extension 223, Email Server 231, Other 233, Message Hosting Module 241, Notification Module 242, and/or practice (aspects of) processes 200 and 300 of FIGS. 2 and 3, respectively, earlier described, in accordance with various embodiments. As illustrated, computer-readable storage medium 502 may include the executable code of a number of programming instructions or bit streams 504. Executable code of programming instructions (or bit streams) 504 may be configured to enable a device, e.g., computer device 400, in response to execution of the executable code/programming instructions (or operation of an encoded hardware accelerator 405), to perform (aspects of) process 200 of FIG. 2, 300 of FIGS. 3, and 300A of FIG. 3A, respectively. In alternate embodiments, executable code/programming instructions/bit streams 504 may be disposed on multiple non-transitory computer-readable storage medium 502 instead. In embodiments, computer-readable storage medium 502 may be non-transitory. In still other embodiments, executable code/programming instructions 504 may be encoded in transitory computer readable medium, such as signals.

Referring back to FIG. 4, for one embodiment, at least one of processors 402 may be packaged together with a computer-readable storage medium having some or all of computing logic 422 (in lieu of storing in system memory 404 and/or mass storage device 406) configured to practice all or selected ones of the operations earlier described with reference to FIGS. 2, 3 and 3A. For one embodiment, at least one of processors 402 may be packaged together with a computer-readable storage medium having some or all of computing logic 422 to form a System in Package (SiP). For one embodiment, at least one of processors 402 may be integrated on the same die with a computer-readable storage medium having some or all of computing logic 422. For one embodiment, at least one of processors 402 may be packaged together with a computer-readable storage medium having some or all of computing logic 422 to form a System on Chip (SoC). For at least one embodiment, the SoC may be utilized in, e.g., but not limited to, a hybrid computing tablet/laptop.

Referring now to FIGS. 6-25, various screen shots of an example customer service chat interaction is illustrated, where a current conversation window may be popped out of a main UI, and further interacted with, in accordance with various embodiments. These figures are next described.

FIG. 6 illustrates an example screen shot of an example customer service agent's main display 600, with an overlay indicating the function of each of four separate windows which comprise main display 600. In particular, the four windows include a "My Chats" window 610, a "Customer Info" window 620, a "Current Conversation" window 630 and finally a "Knowledge" window 640. The contents and function of these four windows are next described with reference to FIG. 7, which depicts the underlying objects in each window without the overlay. In embodiments, Current Conversation window 630 may be popped out and separately displayed, either floating above main window 600, or ported to another screen. In embodiments, when that happens, FIG. 7 illustrates detail of the four windows comprising the example main display of FIG. 6. It is here noted that the screen shots depicted in FIGS. 6-25 relate to an exemplary fictional customer service representative named "Jason Dewar" who may work for amazon.com. Jason may sometimes be referred to in FIGS. 6-25, and in their description herein, as "agent Jason." As is shown in the various figures, which are mockups, agent Jason has exemplary online chats with several fictional individuals or customers, and in the process of conducting those chats uses a live agent window according to various embodiments. Two example chats involving agent Jason will be discussed as running examples, so as to illustrate functionality according to various embodiments. These include a chat with customer Andy Martinez regarding an issue he has with his Amazon Echo, namely that it was somehow erroneously programmed to communicate in French, and a chat that agent Jason has with customer Taylor Watson-Rice regarding replacing her broken Amazon Echo.

With reference to FIG. 7, My Chats window 710 includes several customer chats, listed by most recent at the top and least recent at the bottom. One of them is a current chat, chat 711 with customer Andy Martinez. To indicate that chat 711 with Andy Martinez is the current chat, its field has a white background, as opposed to the other chats listed in My Chats window 710 which are displayed with shaded backgrounds. Current chat 711, as do all of the chats displayed in window 710, displays a few words from the last comment in the chat. Thus, chat 711 with Andy Martinez displays the first few words of the last response 735 in the chat: "Sure, no problem, Many customers facing . . . ", as shown in Current Conversation window 715.

Continuing with reference to FIG. 7, Customer Info window 720 displays various contextual details to agent Jason regarding the live chat with Andy Martinez. These are provided in the following fields: Contact Detail 721, Chat Transcript Detail 723 and Case Detail 725. It is here noted that Case Detail 725 will be described in greater detail below, with reference to FIGS. 15 through 17. As noted, Current Conversation window 715 displays the last few entries in the chat, and Knowledge window 740 displays relevant knowledge to the issue being discussed in the current chat to assist the customer service agent. Thus, as may be seen in Knowledge window 740, there are several displayed blurbs which relate to the Amazon Echo, which may assist a customer service agent in responding to the customer's concerns. Finally, pop-out button 720 appears at the bottom left of Current Conversation window 715, which, in embodiments, allows a user (here agent Jason) to pop-out the Current Conversation window 715 and have it displayed as a separate entity, either floating above main display 700, or portable to a separate display, e.g., a second monitor. In either case, in embodiments, after being popped-out, Current Conversation window 715 is independently moveable and sizeable by a user. Once the live chat window is popped-out, agent Jason may review important records at the same time, which may be displayed in the current position of live chat window 715.

Figure 8:
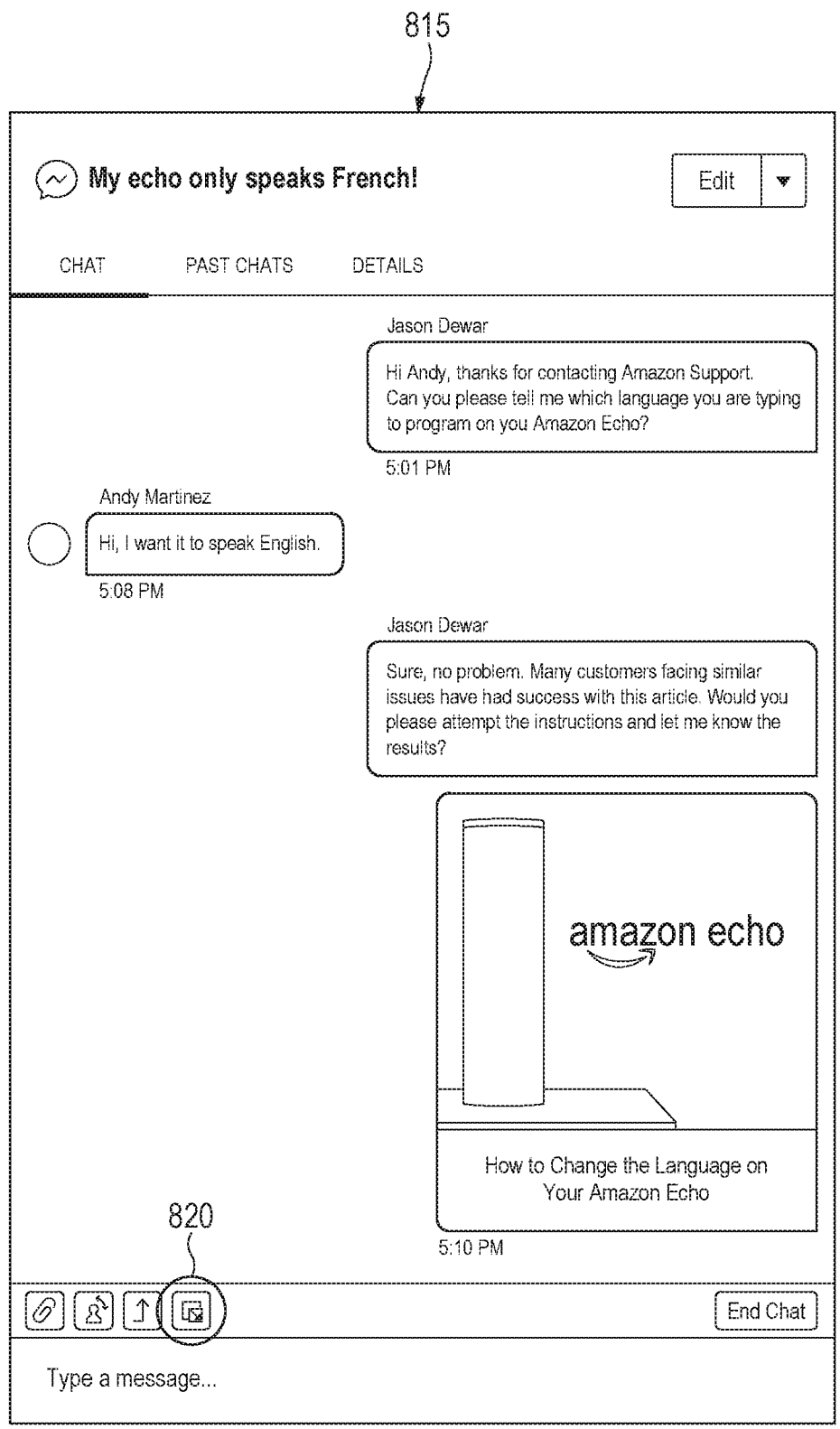
FIG. 8 illustrates a magnified view of just the current conversation window of FIG. 7, according to some implementations.

FIG. 8 illustrates a magnified version of Current Conversation window 815, in accordance with various embodiments, for ease of inspection.

Referring now to FIG. 9, popped-out widow 915 is shown displayed in front of the UI. As may be seen by comparison with FIG. 7, it displays the exact same content as when it was part of the default UI 700. To pop the window back in, a user may, for example, click on pop-out button 925, which toggles between the popped-out and popped-in states of window 915. In embodiments, the pop-out button 925 may appear at the top of popped-out window 915, as shown, for easy interaction. It is noted that the popping-out of widow 915 has not changed any dimension of the UI, and thus, in the area formerly occupied by window 915, the same header is shown ("My echo only speaks French") and the "Past Chats" menu item is now active, so that the vacated window now shows past chats that the current customer, Andy Martinez, has had with previous customer service agents. Additionally, "My Chats" window shows the current chat 911 as being with customer "Andy Martinez."

Figure 10:
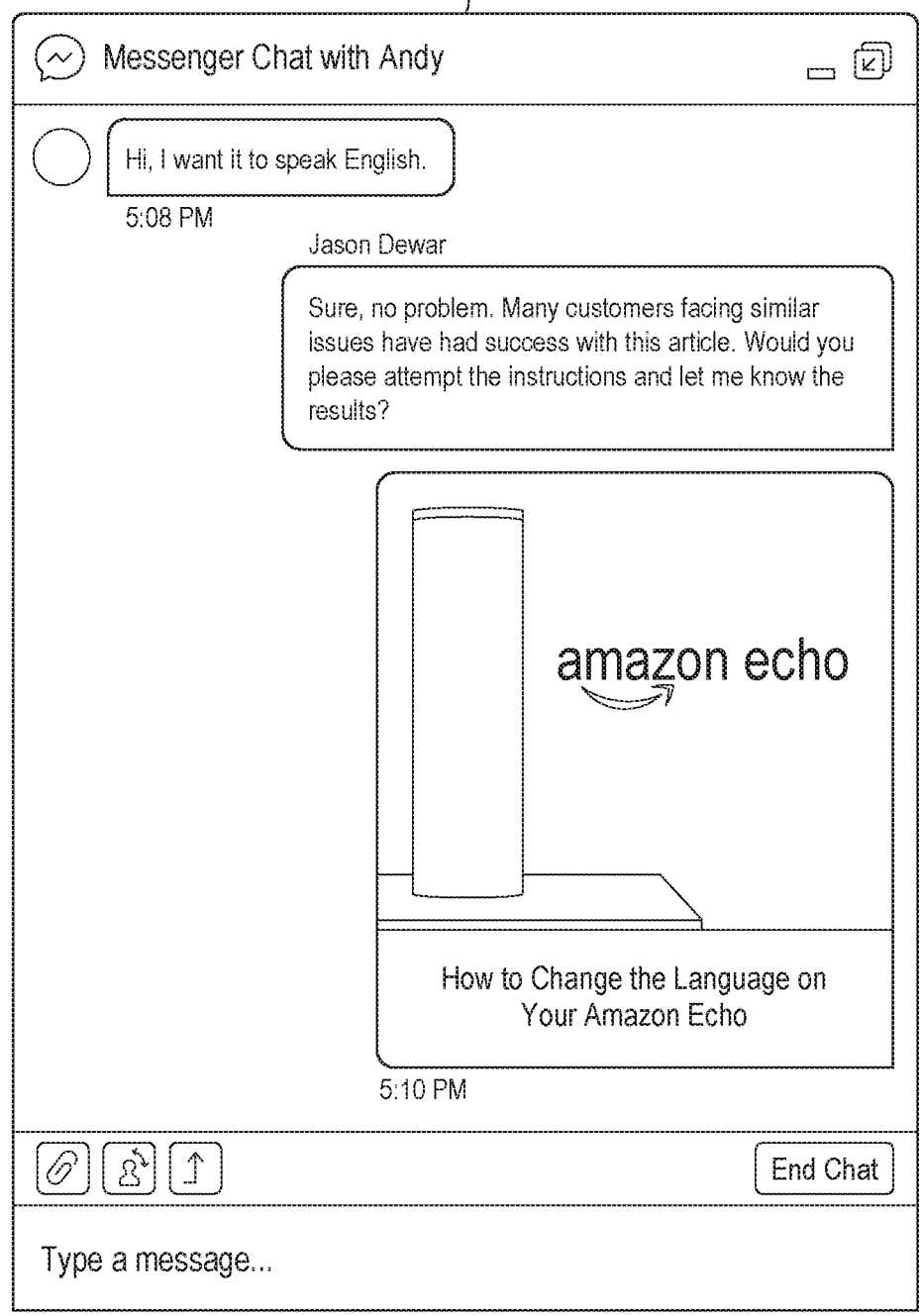
FIG. 10 illustrates a magnified view of the popped out chat window of FIG. 8, according to some implementations.
Figure 12:
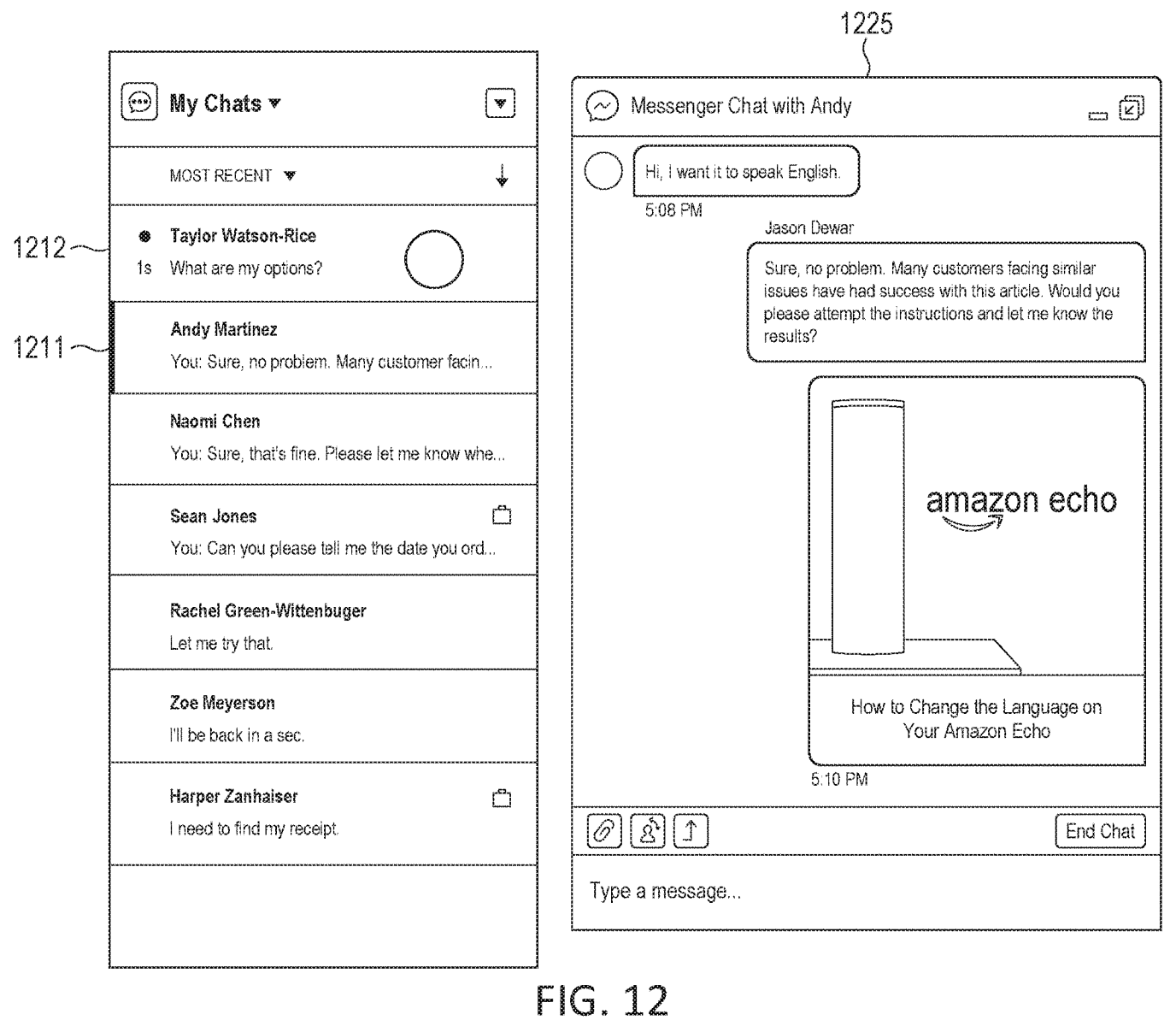

FIG. 10 depicts a magnified view of popped-out widow 1015, for ease of inspection. FIG. 11 illustrates what happens when a new response from one of the ongoing chats, but different than the current chat, comes in. Thus, as shown at 1111, while the current chat is with customer "Andy Martinez", a new response 1112, from an ongoing chat with "Taylor Watson-Rice" is now displayed in "My Chats" column 1110. FIG. 12 presents a magnified version of My Chats window 1210 and popped-out window 1225 for ease of inspection. As may be seen the current chat 1211 is still, at this point, with Andy Martinez, and the new message from Taylor Watson-Rice 1212 was received 1 second previously.

Referring now to FIG. 13A, agent Jason has now changed his chat to the Taylor Watson-Rice, as shown at 1312. Once that happens, the entire chat console changes to the new context, and popped-out window 1315 now displays the pending chat with Taylor Watson-Rice, including her latest response "What are my options." As a result of the same context change, window 1330 still displays past chats, but now the past chats are those involving Taylor Watson-Rice. Also noted, in preparation for the creation of a case, as described below, is box 1330, which allows a user, here agent Jason, to create a "case" which is an action item that may be handled by others in the enterprise, and which require more investigation than a customer service agent in a live chat can usually provide.

FIGS. 13B through 13D were described in detail above, in connection with FIGS. 3 and 3A, and need not be further described again in detail. They respectively show the same display as is shown in FIG. 13A, except that they illustrate an alternate embodiment, where a change to a new live chat does not alter a previously popped-out separate moveable window, except to display it as inactive. Thus, FIG. 13B illustrates the UI interface main display and the popped-out chat window of FIG. 12, after the agent has changed to a new active chat, according to alternate implementations.

Similarly, FIG. 13C illustrates the UI main display and two popped-out chat windows, after the agent has popped out the active chat window shown in the bottom of UI window 1330 (which displays the new active chat with second individual Taylor Watson-Rice), according to alternate implementations. Finally, FIG. 13D illustrates the UI main display and two popped-out chat windows of FIG. 13C, after the agent has changed the active chat back to customer "Andy Martinez", which causes the second separate moveable window 1327 to be displayed as inactive, according to alternate implementations.

Figure 14:
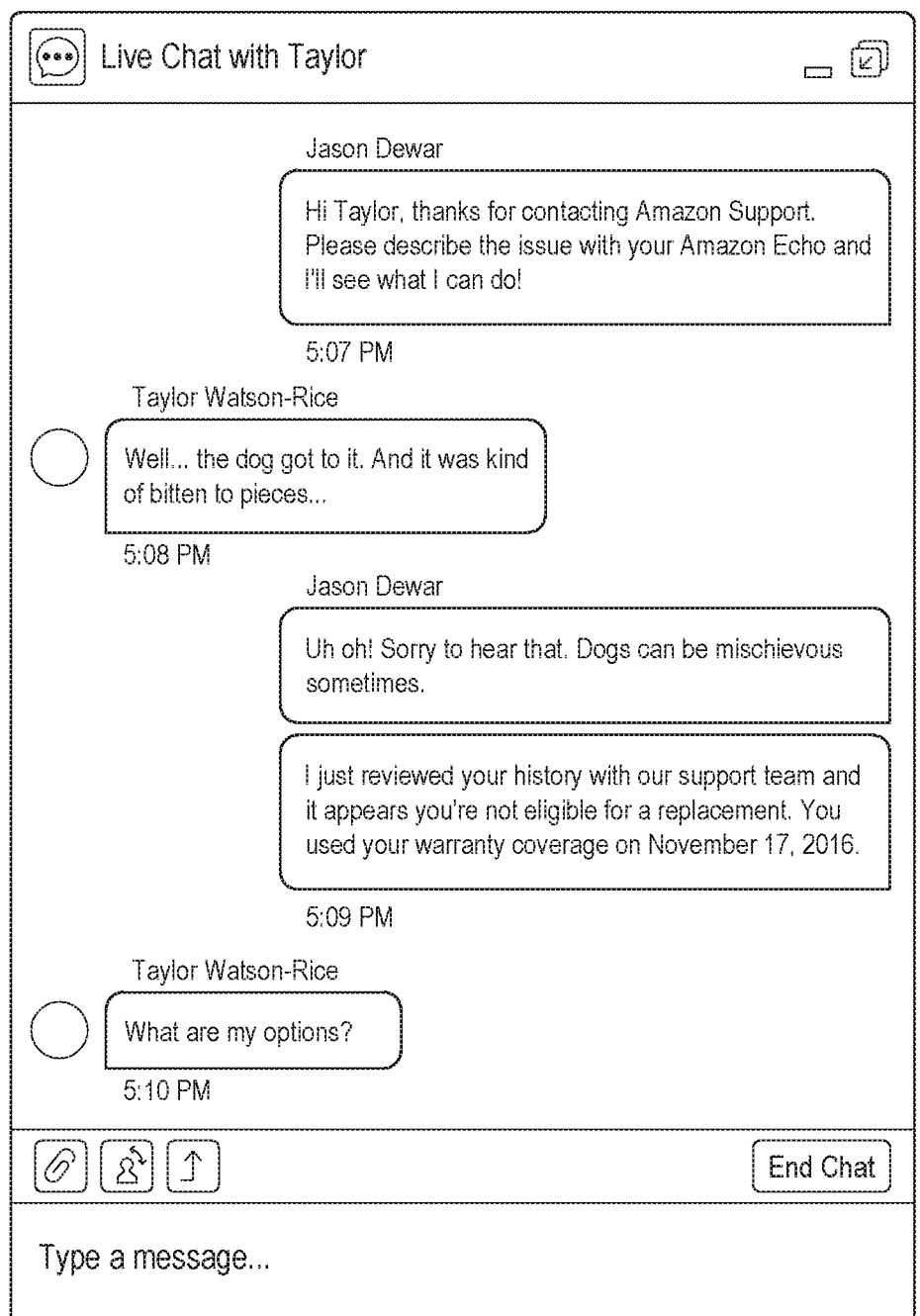
FIG. 14 illustrates a magnified view of the popped-out chat window of FIG. 13B, according to some implementations.

FIG. 14 is a magnified view of popped-out window 1415, shown in FIGS. 13A and 13C, which displays most recent messages in the chat with Taylor Watson-Rice.

Figure 15:
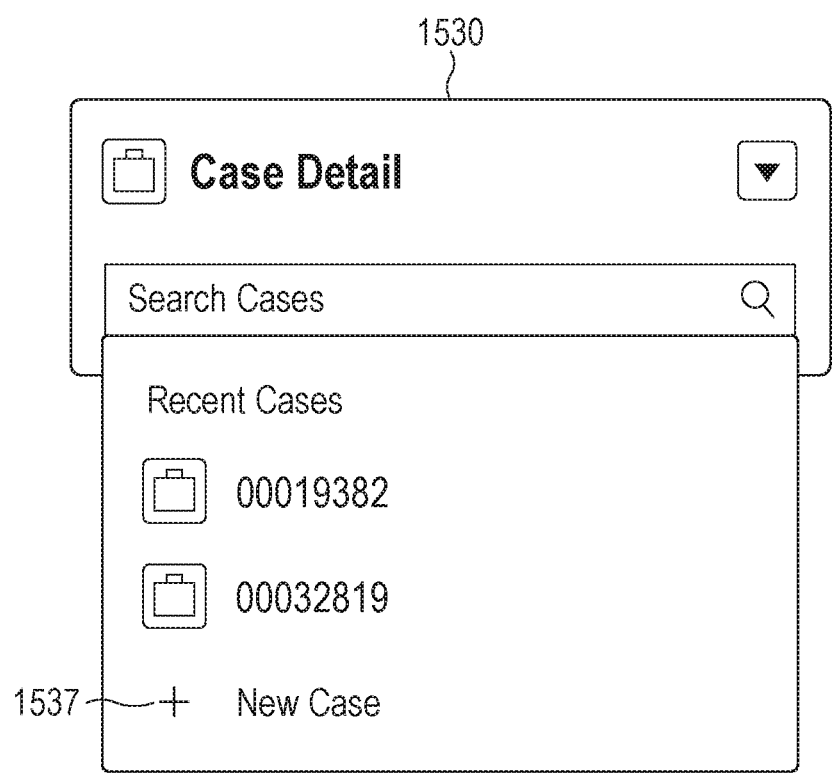
FIG. 15 illustrates a magnified view of the Case Detail field of the Customer Info window of FIG. 11, according to some implementations.

Referring now to FIG. 15, detail of the "case" box 1530, described above, is shown. Here a user may create a new case, using button 1537, for example, as Jason is about to do for the issue Taylor Watson-Rice has messaged him about. Referring now to FIG. 16, this depicts the Create Case screen that a user sees following interacting with the create case button 1537 of FIG. 15. The Create Case screen is displayed in place of the normal chat UI, as shown by case indicator 1601, however, as shown in FIG. 17, the My Chats window at the far left of the UI, as well as the "Related Cases" window at the far right of the UI, may still be displayed, which is why they are ghosted in FIG. 16.

Continuing with reference to FIG. 16, the Create Case screen 1600 requires entry of the "case owner" 1643, in this case amazon.com customer service agent Jason Dewar, the contact for the case 1640, here Taylor Watson-Rice, and the asset being described or referred to 1645, here the Amazon Echo Dot, which Taylor Watson-Rice initially contacted customer service about, as shown in her live chat and past chats, as shown in FIG. 13. It is also noted in connection with FIG. 16, that the popped-out live chat window 1615 is still being displayed, inasmuch as it is now—although content wise contextually linked to the UI, it is not part of the UI, and thus independently displayed. In embodiments this may be very useful to a customer service agent, who may wish to refer to the live chat messages when creating a case for that customer.

Figure 17:
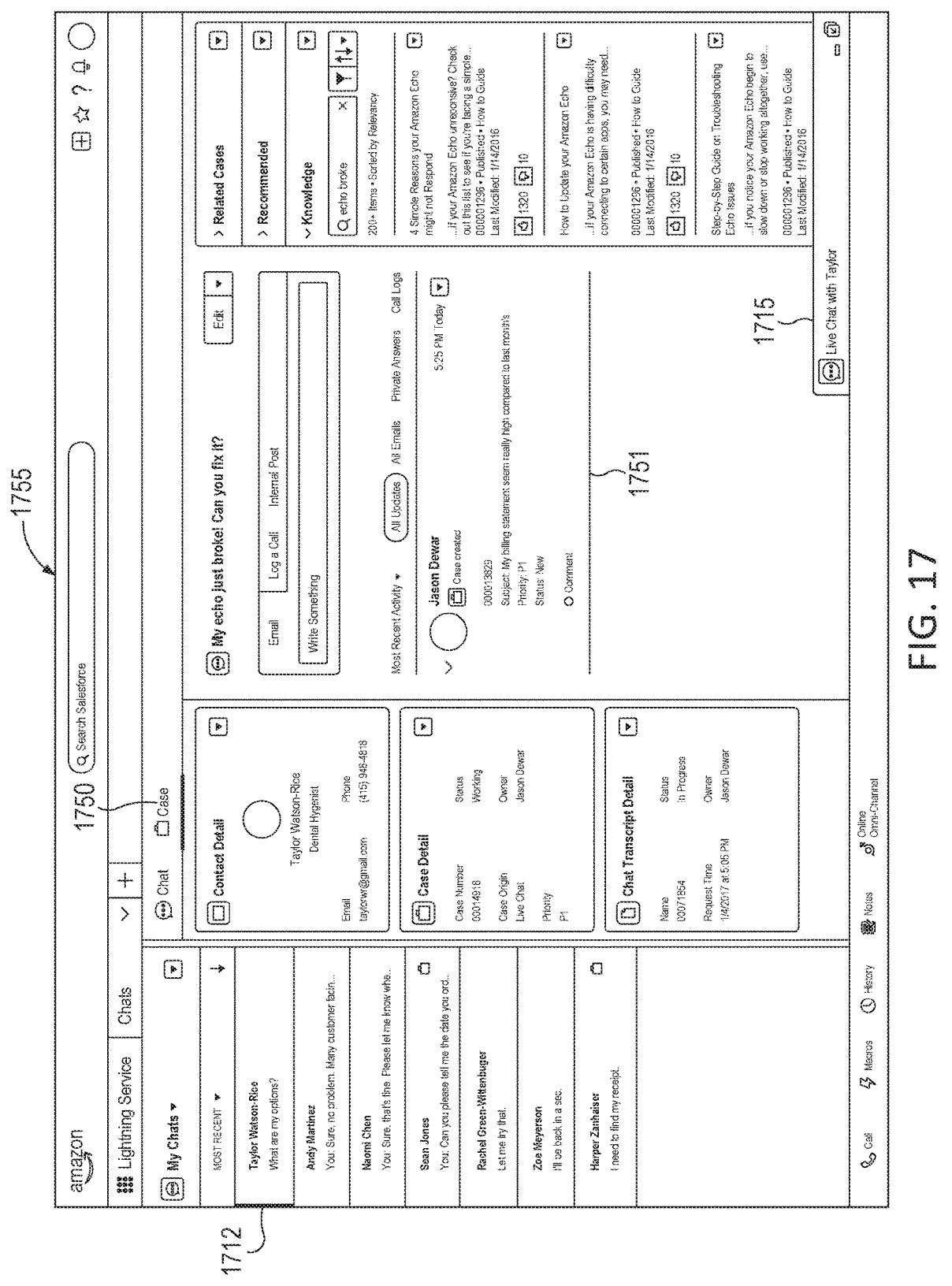
Figure 18:
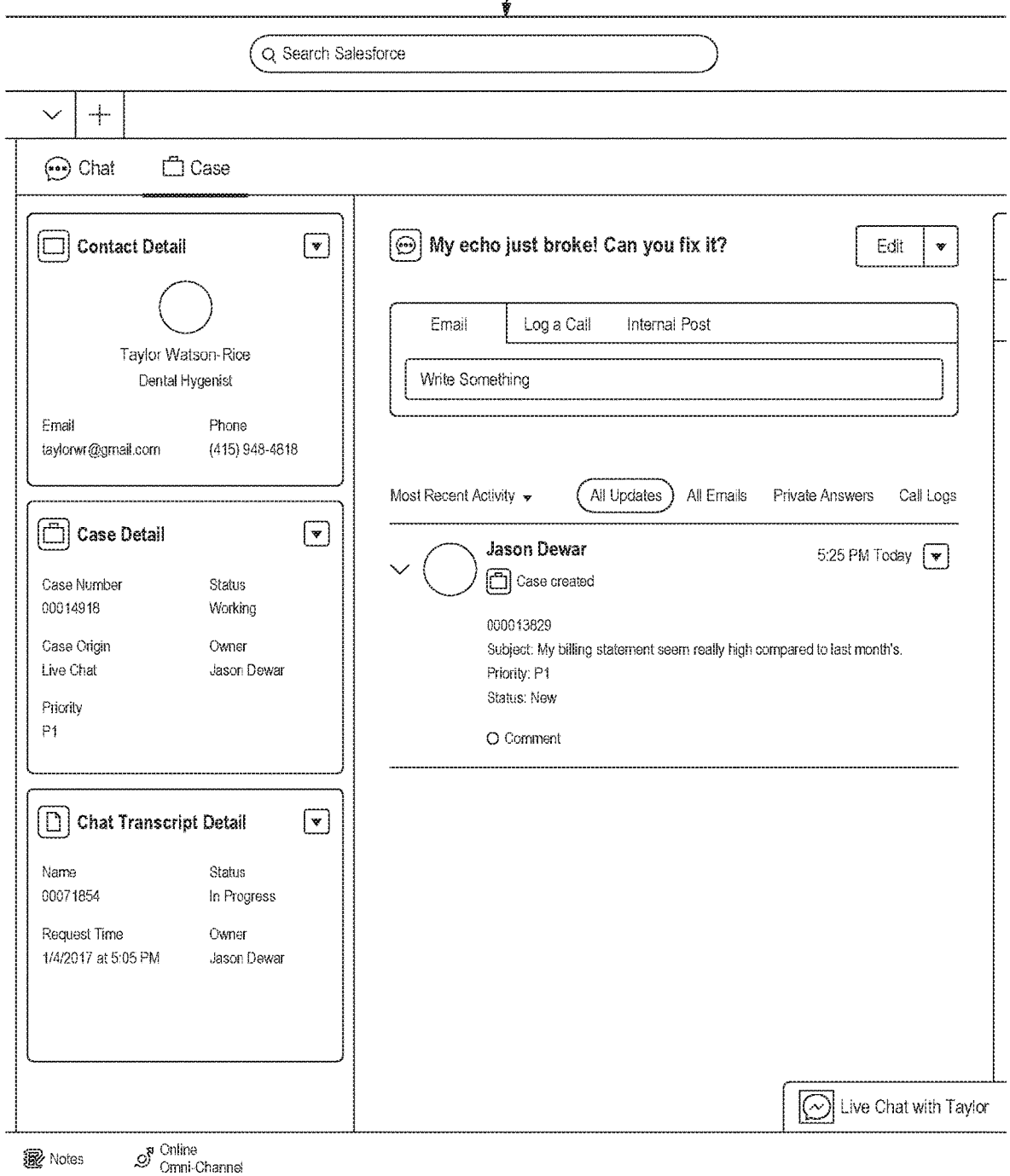
FIG. 18 illustrates a magnified view of the two middle windows of the user interface of FIG. 17, according to some implementations.

FIG. 17 presents an exemplary UI displayed to a user once the case has been created. Although, as noted, the center two windows display information relative to the case created for Taylor Watson-Rice, the content displayed in the two end windows has not changed. With reference to FIG. 17, menu selector button 1750 for "case" is active, the My Chats window indicates that the current chat 1712 is with Taylor Watson-Rice, box 1751 indicates that the most recent activity was creation of a previous case for Taylor Watson-Rice regarding her higher than normal billing statement. Finally, popped out live chat window 1715 remains visible at the bottom right of the screen, where agent Jason has moved it, so as to be able to interact with the case content 1755. To allow easier inspection of the case content windows 1855, FIG. 18 presents a magnified view of these two windows.

FIGS. 19-25, next described, relate to an enhanced pop-out window according to various embodiments. The enhanced features include "raise a flag" and "whisper", which were described above in connection with FIG. 3. To the extent that features of FIGS. 19-25 are equivalent as those described above in connection with FIGS. 7-10, they will not be further described except in passing.

Figure 19:
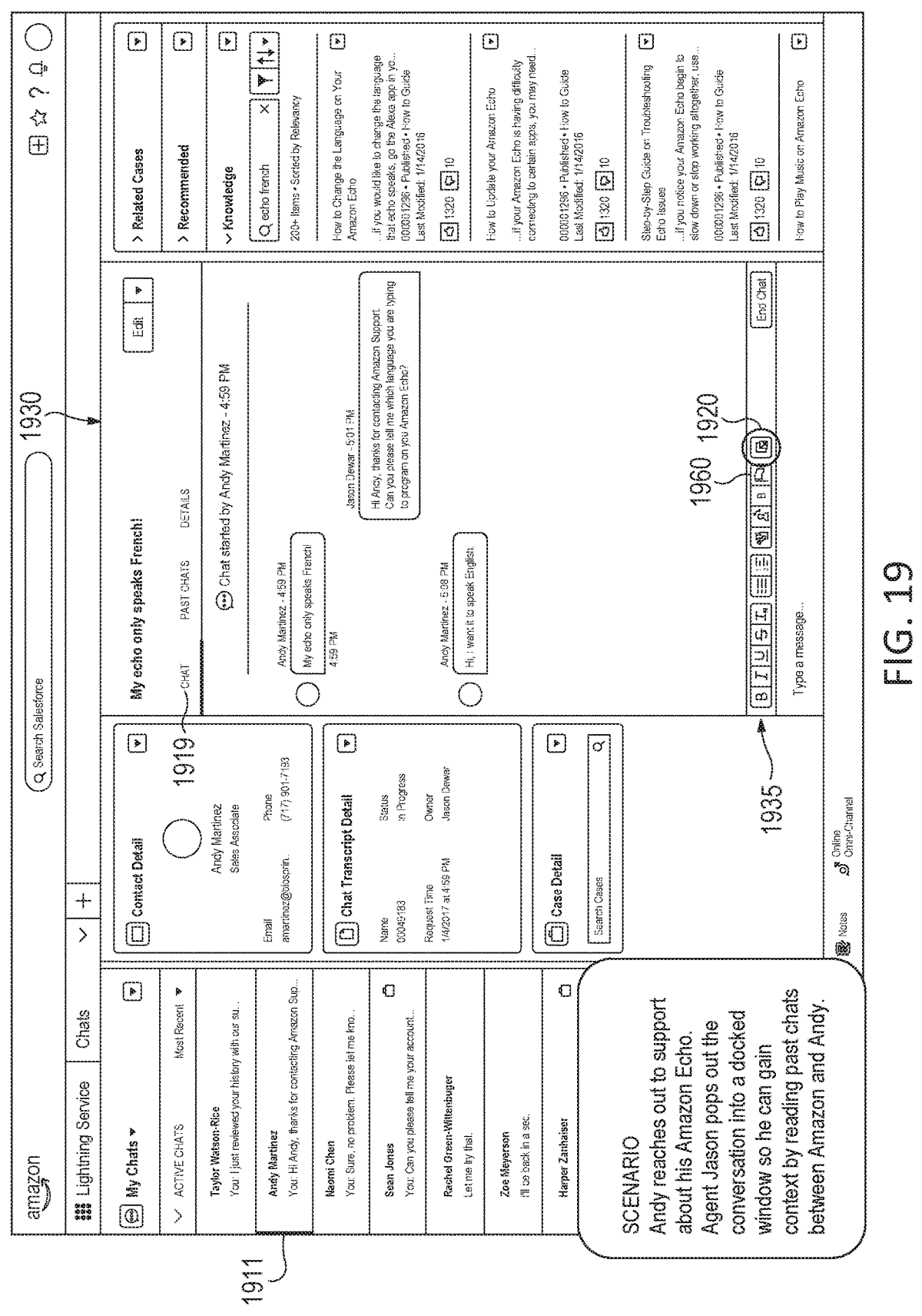
Figure 20:
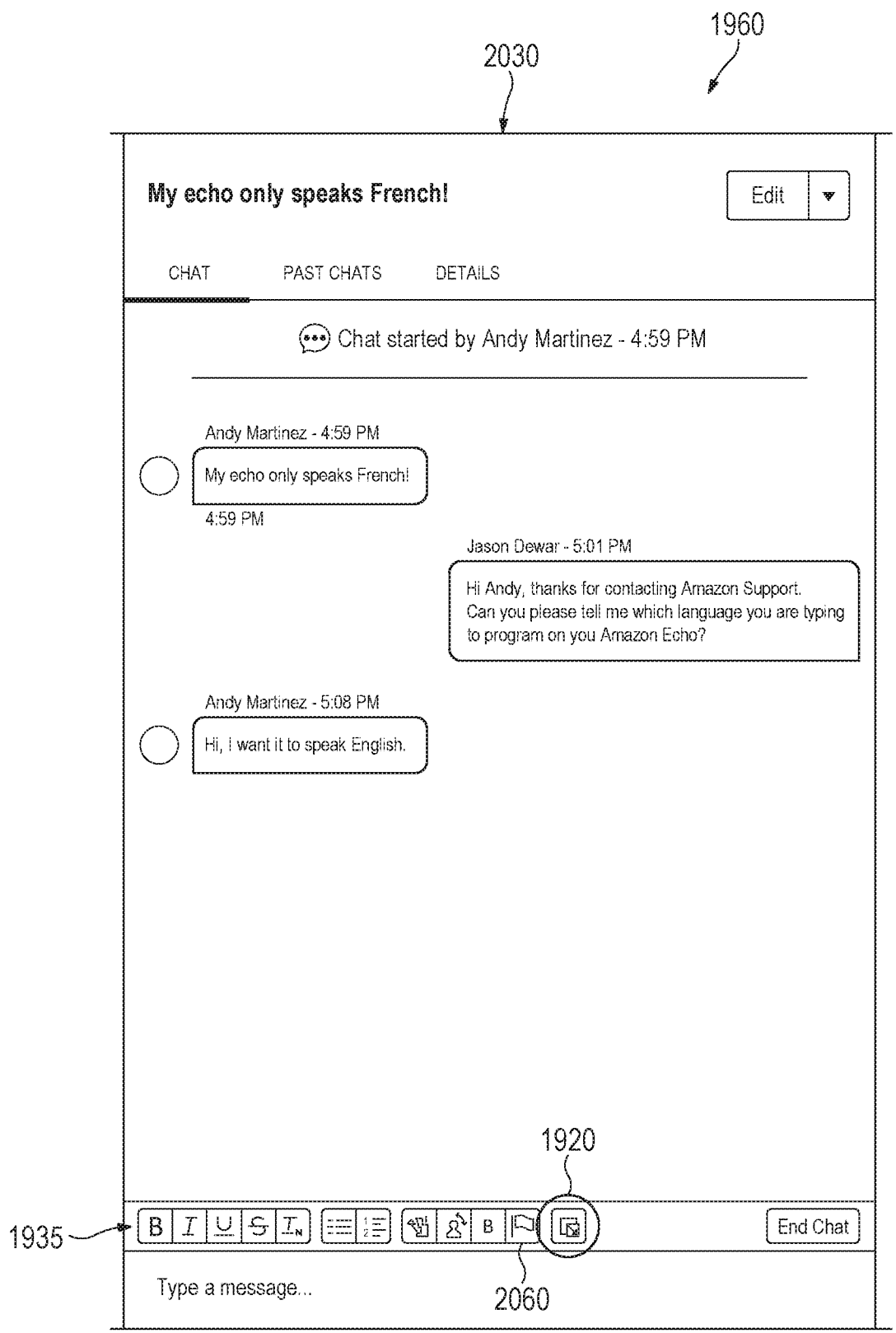
FIG. 20 illustrates detail of the Current Conversations window of FIG. 19 according to some implementations.

Referring now to FIG. 19, FIG. 19 depicts an exemplary UI, similar to that of FIG. 7. Here a current chat is ongoing with customer Andy Martinez, as shown by My Chats indication 1911. The Current Conversation window 1930 displays the live chat 1919 with Andy Martinez, who has reached out to Amazon Echo support regarding his Amazon Echo. Notable is enhanced toolbar 1935 in the live chat window, which has pop-put button 1920, but now also flag button 1960. FIG. 20 is a magnified view of live chat window 2030, and the enhanced toolbar just described.

Figure 21:
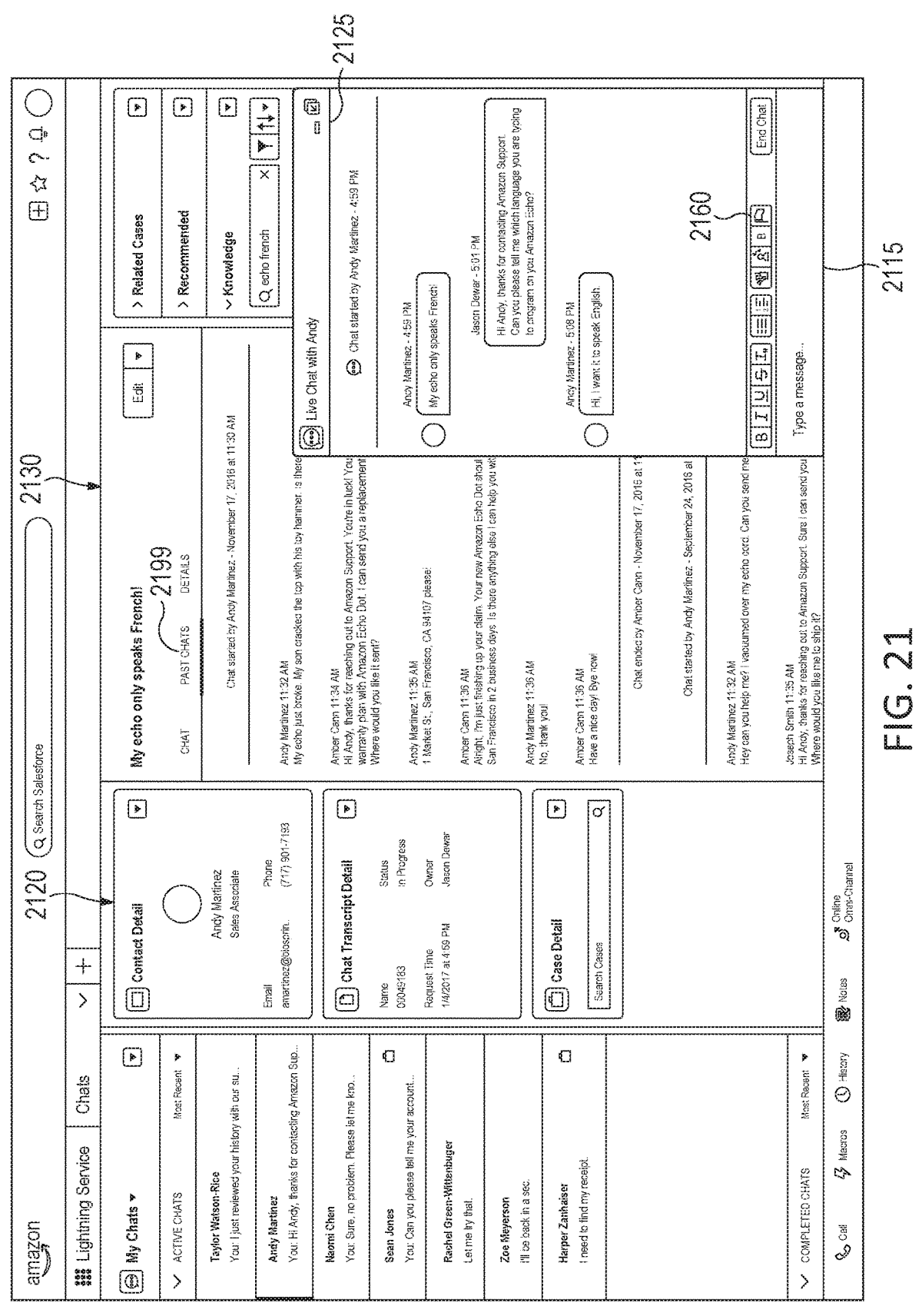

Referring now to FIG. 21, a situation equivalent to that depicted in FIG. 9, is shown, where live chat window 2115 has been popped-out, and now separately displayed over the UI in a moveable window. As a result, Current Conversations window 2130 displays past chats 2119 with the customer. Popped-out window 2115 may be popped back in via button 2125, as described above.

Figure 22:
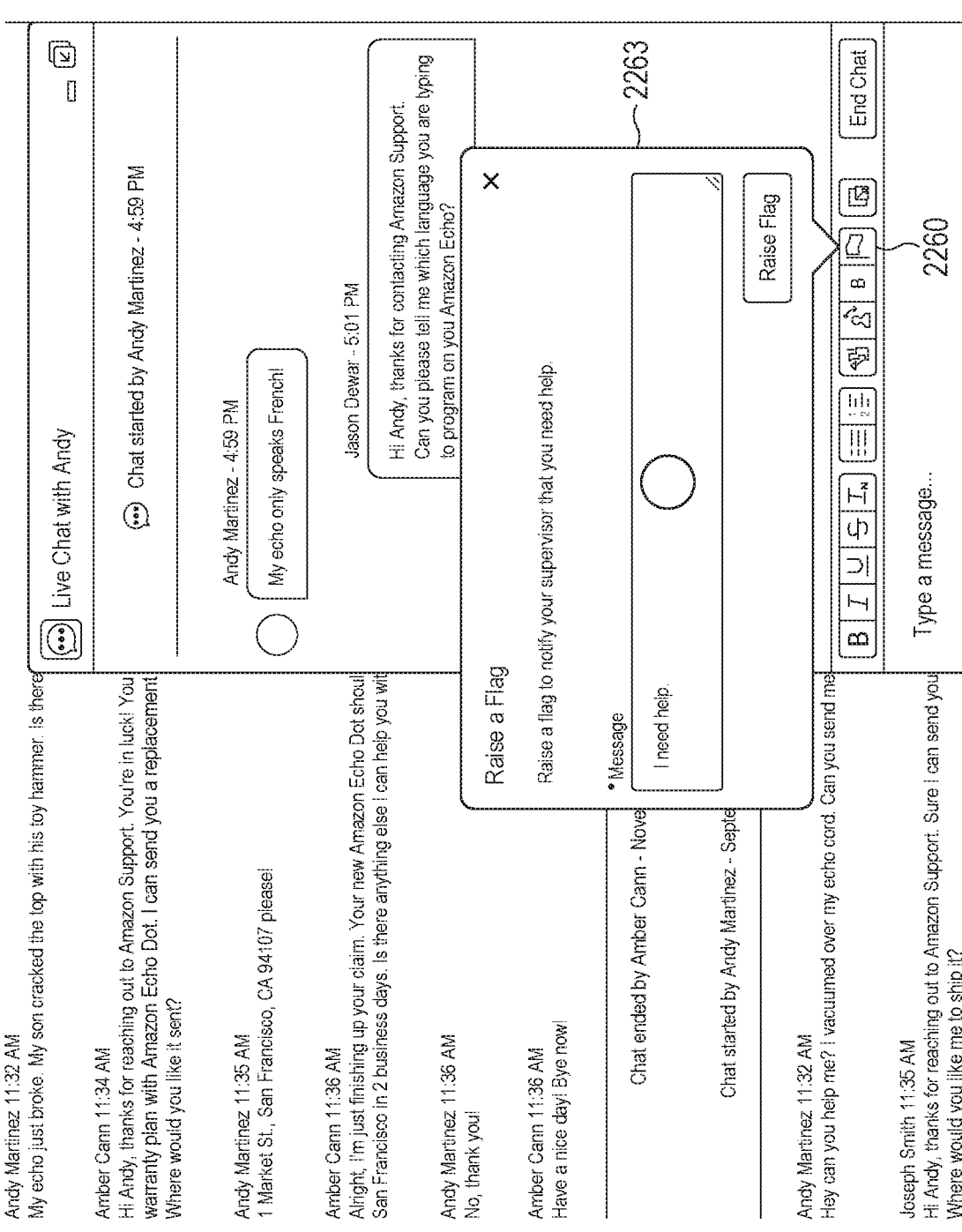
FIG. 22 illustrates the Raise a Flag pop-out according to some implementations.

Finally, flag button 2160 is shown, highlighted in a lightly shaded circle. Customer service agent Jason may click on it, or otherwise interact with it, as described above, to ask his supervisor's help. The result of interacting with flag button 2160 is depicted in FIG. 22, which shows a new "Raise a Flag" window 2263 displayed over the popped-out chat window 2215, which "hovers" above flag button 2260. In embodiments, Raise a Flag window 2263 may be used to alert agent Jason's supervisor and ask for his or her assistance with a customer service problem.

Figure 23:
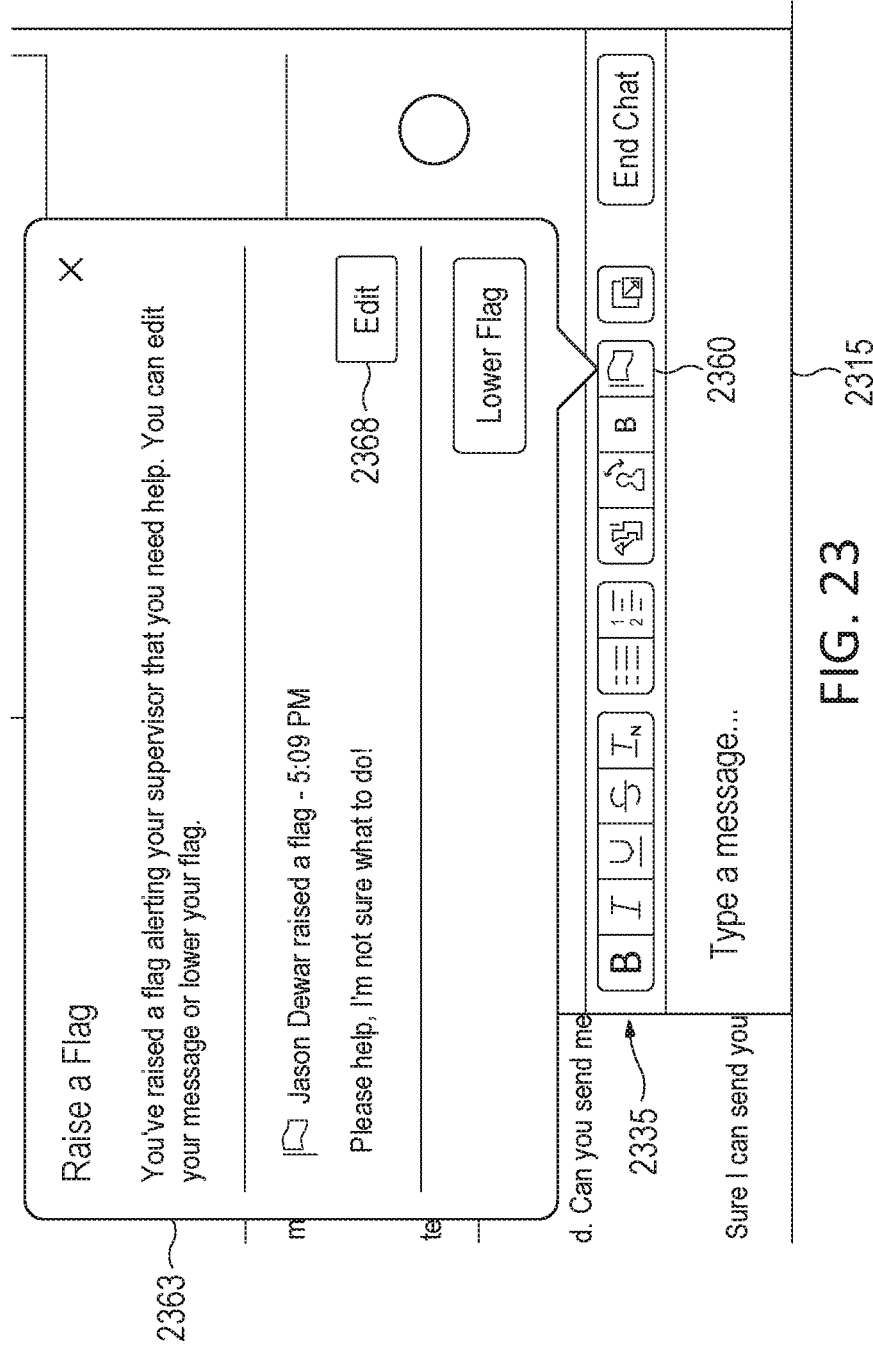
FIG. 23 illustrates the raise a flag pop-out after the agent has entered a message for his supervisor, and how to close the raise a flag pop-out, according to some implementations.
Figure 24:
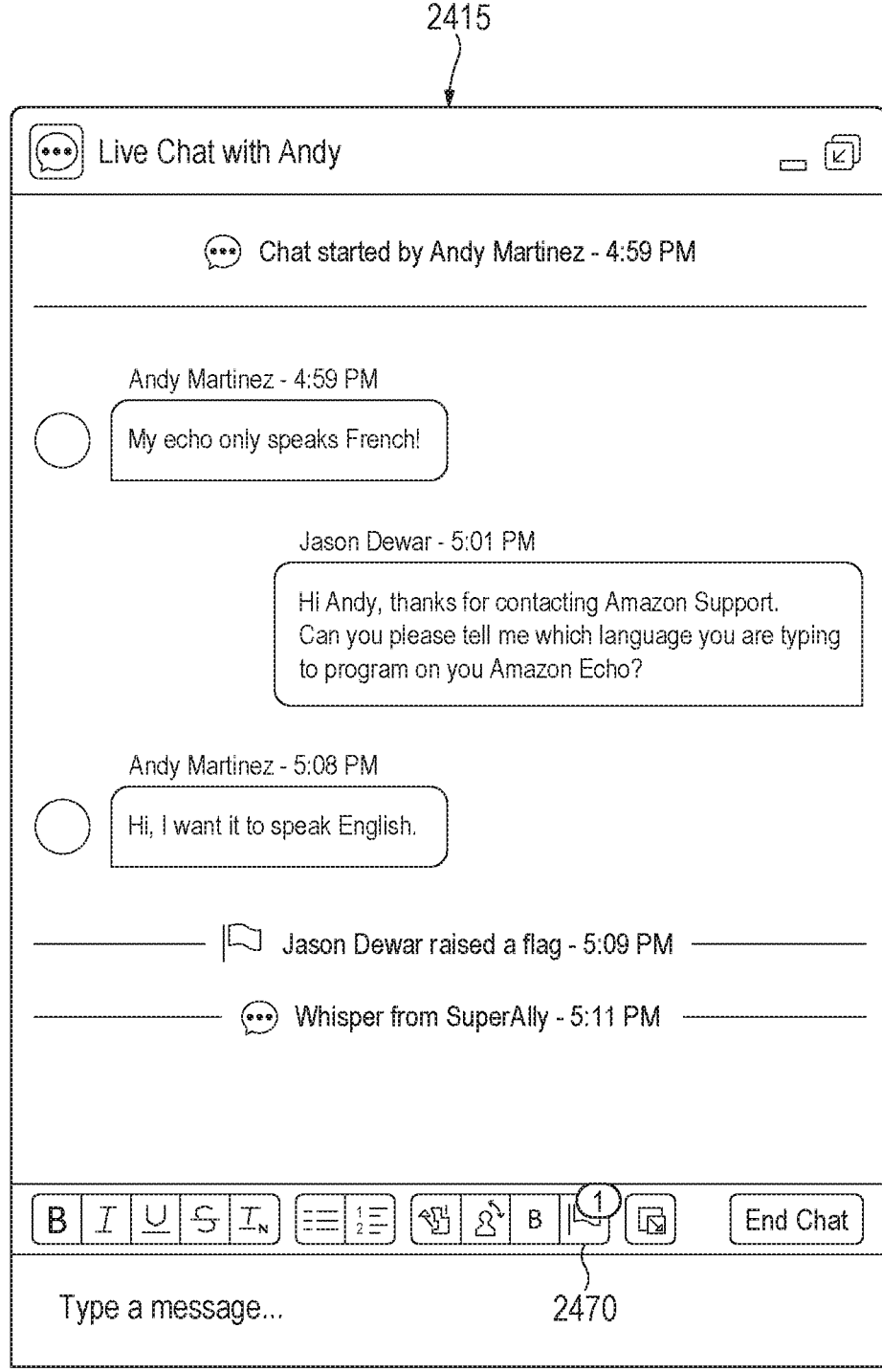
FIG. 24 illustrates the popped-out chat window of FIGS. 21 and 22 now showing snippets of the raise a flag and whisper activity within the window, and an indication of a new whisper message, according to some implementations.

Referring now to FIG. 23, a magnified version of Raise a Flag window 2363 is shown. Here agent Jason has entered a message in Raise a Flag window 2363, which he may further edit by engaging "Edit" button 2368. There is also an option to lower the flag, via button 2360, effectively cancelling the request for assistance. In the background is seen popped-out live chat window 2315, with enhanced toolbar 2335, including flag button 2360. The shading in flag button 2360 here indicates that the Raise a Flag window is open, and once the "X" is pressed by Jason to close the window, then the display of FIG. 24 may be seen. FIG. 24 depicts popped-out live chat window 2415. As shown, the "raise a flag" messaging activity is displayed within the live chat window, but is not visible to the other party to the chat, in this case customer Andy Martinez. As also seen in FIG. 24, at 2471 a "whisper" from "SuperAlly" has been noted. This corresponds to a message response from the supervisor, responding to the message in the flag sent by agent Jason, as shown in FIG. 23. The message is not yet visible, because agent Jason had closed Raise a Flag window 2363, as shown in FIG. 23. However, in addition to the remark at 2471 in FIG. 24 regarding the whisper, flag button 2470 has a "1" with a circle around it, indicating that a message is in the Raise a Flag queue. To see the new message, which is from "SuperAlly", agent Jason must re-open the "Raise a Flag" window. In embodiments, He may do so by clicking or otherwise engaging with flag button 2470. The result of that action is shown in FIG. 25.

Figure 25:
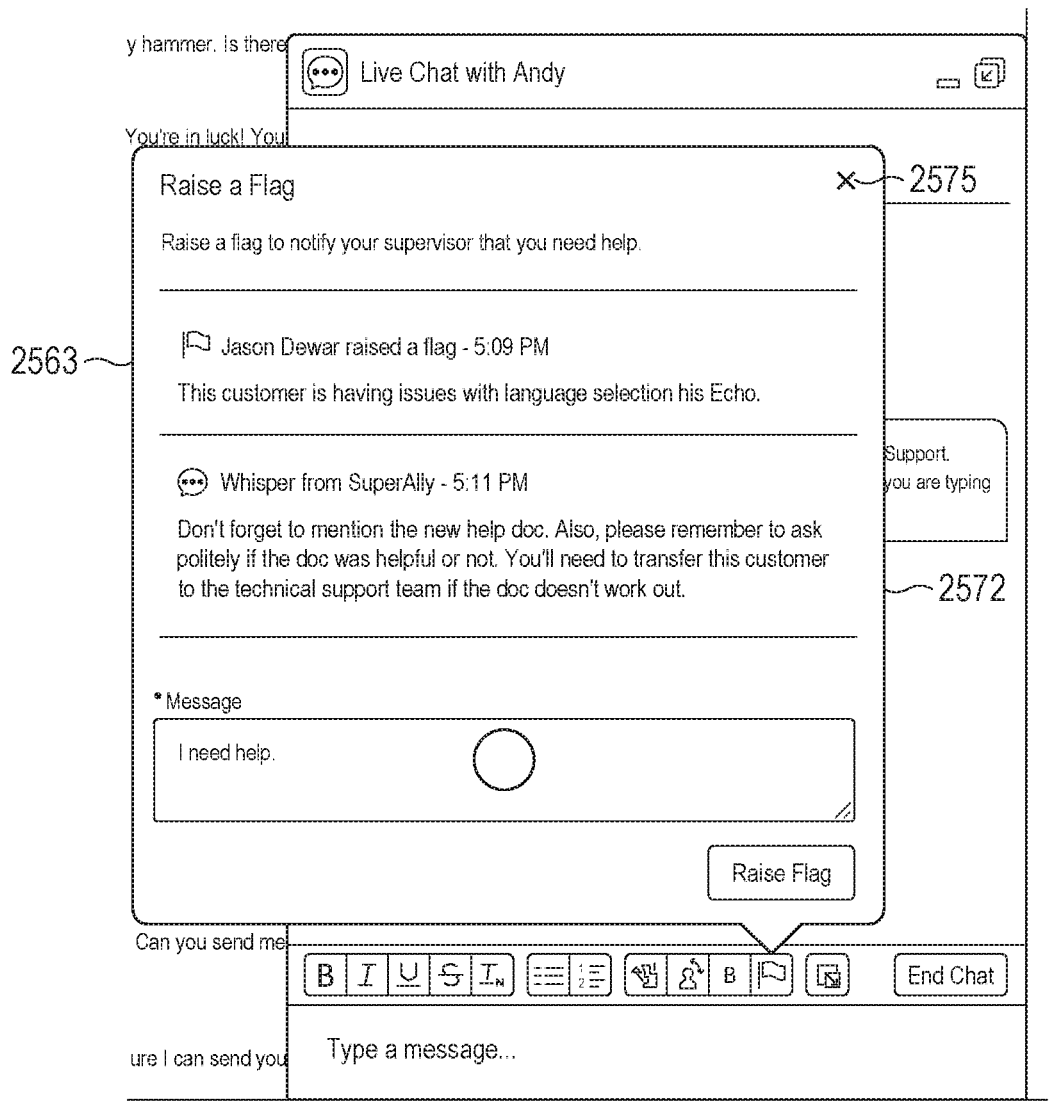
FIG. 25 illustrates the result of re-opening the raise a flag pop-out to view the whisper, according to some implementations.

Referring now to FIG. 25, a magnified version of now re-opened Raise a Flag window 2563 is shown. In it appears the response 2572 from SuperAlly, a "whisper." It is here called a whisper, inasmuch as it is invisible to the other party to the live chat, the customer, and thus the flag and whisper messaging is only visible internally, to those on the customer service team. To return to the live chat, agent Jason may simply interact with, for example, click on, the "X" 2575 on the top right of Raise a Flag window 2563, and the unencumbered live chat window will be seen, as shown in FIG. 24.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples may include those with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed. Thus, in general, implementations may be practiced without use of multi-tenant databases, and without deployment on application servers.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method, comprising:
    causing a user interface (UI) to display at least three windows on a user system of a service agent, the at least three windows including: i) a first window to display a live chat between the service agent and a first customer, ii) a second window to display content related to one of the live chat and information relating to the first customer, and iii) a third window to display a list of sub-windows associated with several chat sessions with other customers, including the live chat with the first customer, wherein the sub-window associated with the first customer visually indicates the live chat;
    receiving a first indication, from the first user or the user system, to pop-out the first window that displays the live chat;
    in response to the first indication:
        causing the first window to be displayed as a separate popped-out first window that continuously displays messages in the live chat between the service agent and the first customer; and
        causing an original area of the first window left by the popped-out first window to be filled in with content related to at least one of previous messages of the first customer or information relating to the first customer;
    receiving a second indication, from the first user or the user system, to change the live chat from the first customer to the second customer; and
    in response to the second indication:

causing the separate popped-out window to display the live chat between the service agent and the second customer, and visually indicating in the sub-window associated with the second customer in the third window that the second customer is a participant in the live chat;

causing the original area the first window left by the popped-out first window to display additional content related to at least one of previous messages of the second customer or information relating to the second customer; and causing the second window to display content related to at least one of previous messages of the second customer and information relating to the second customer.

2. The method of claim 1, wherein the separate popped-out first window is displayed in front of the UI.

3. The method of claim 1, wherein the separate popped-out first window is displayed on a different monitor than a monitor on which the UI is displayed.

4. The method of claim 1, further comprising: following causing the first window to be displayed as the separate popped-out first window, preserving the dimensions of the windows displayed by the UI, including original dimensions of the first window.

5. The method of claim 4, further comprising causing to be displayed in the-original area of the first window a sequence of previous messages from the live chat that are immediately prior to those displayed in the separate popped-out first window.

6. The method of claim 1, wherein receiving the first indication further comprises: receiving a selection, by the service agent, of any of the sub-windows associated with the other customers in the third window to become a current live chat.

7. The method of claim 6, wherein the first indication includes at least one of: the service agent engaging with a button, the service agent speaking an audible command, the service agent typing in a command or code for a command, or the like.

8. The method of claim 1, wherein the first indication includes the service agent clicking or engaging with a pop-out button provided at an edge of the sub-windows.

9. The method of claim 1, further comprising: causing to be displayed an interactive button at an edge of the separate popped-out first window that, when activated, causes the separate popped-out first window to be popped back into an original area of the first window.

10. The method of claim 1, further comprising:
receiving a third indication from the service agent, while the separate popped-out first window is displayed, to send an internal message to a colleague, and in response to the third indication:
causing a new window to be displayed in front of and associated with the separate popped-out first window, in which to compose and send the internal message to the colleague.

11. The method of claim 1, further comprising causing the first indication to be automatically generated by the user system after the first live chat has continued for a pre-defined time.

12. A non-transitory computer-readable medium storing a computer program for interactively displaying content, the computer program comprising a set of instructions operable to cause a computer to:
cause a user interface (UI) to display at least three windows on a user system of a service agent, the at least three windows including: i) a first window to display a live chat between the service agent and a first customer, ii) a second window to display content related to one of the live chat, and iii) a third window to display a list of sub-windows associated with several chat sessions with other customers, including the live chat with the first customer;

receive a first indication, from the first user or the user system, to pop-out the first window that displays the live chat;

in response to the first indication:
cause the first window to be displayed as a separate popped-out first window that continuously displays messages in the live chat between the service agent and the first customer; and
cause an original area of the first window left by the popped-out first window to be filled in with content related to at least one of previous messages between the service agent and the first customer or information relating to the first customer;

receive a second indication, from the first user or the computer, to change the live chat from the first customer to the second customer; and in response to the second indication:
cause the live chat with the second customer to be displayed in the separate popped-out first window, and visually indicating in the sub-window associated with the second customer in the third window that the second customer is a participant in the live chat;
cause the original area the first window left by the popped-out first window to display additional content related to at least one of previous messages of the second customer or information relating to the second customer; and
cause the second window to display content related to at least one of the previous messages of the second customer or information relating to the second.

13. The non-transitory computer-readable medium of claim 12, further comprising instructions operable to cause the computer to display the separate popped-out first window in front of the UI.

14. The non-transitory computer-readable medium of claim 12, further comprising instructions operable to cause the computer to display the separate popped-out first window on a different monitor than a monitor on which the UI is displayed.

15. The non-transitory computer-readable medium of claim 12, further comprising instructions operable to cause the UI to, following display of the first window as a separate popped-out first window, preserve the dimensions of the windows within the UI, including the original dimensions of the first window.

16. The non-transitory computer-readable medium of claim 12, wherein the first indication includes at least one of: the service agent engaging with a button, the service agent speaking an audible command, the service agent typing in a command or code for a command, or the like.

17. The non-transitory computer-readable medium of claim 12, wherein the first indication includes the service agent clicking or engaging with a pop-out button provided at an edge of the first window.

18. The non-transitory computer-readable medium of claim 12, further comprising instructions operable to cause the computer to: display an interactive button at an edge of the separate popped out first window that, when activated, pops the separate popped out first window back into the original area of the first window.

19. The non-transitory computer-readable medium of claim 12, further comprising instructions operable to cause the computer to:
- receive a third indication from the user, while the separate popped out first window is displayed, to send an internal message to a colleague, and in response to the third indication:
- display a new separate moveable window in front of and associated with the separate popped out first window, in which to compose and send the internal message to the colleague.

20. The non-transitory computer-readable medium of claim 19, further comprising instructions operable to cause the computer to, either:
- display within the new separate moveable window a message received from the colleague, or
- in response to a user indication, close the new separate moveable window, and display an indication that a message has been received from the colleague, within the separate popped out first window.

21. The non-transitory computer-readable medium of claim 12, wherein the first indication is automatically generated after the live chat with the first customer or the second customer has continued for a pre-defined time.

* * * * *